July 31, 1951  W. WOCKENFUSS  2,562,250
ACCUMULATOR CONTROL FOR TABULATING MACHINES
Filed March 4, 1948  19 Sheets-Sheet 1

INVENTOR.
William Wockenfuss,
BY
Edward L. Mueller
ATTORNEY

July 31, 1951 W. WOCKENFUSS 2,562,250
ACCUMULATOR CONTROL FOR TABULATING MACHINES
Filed March 4, 1948 19 Sheets-Sheet 5

INVENTOR.
William Wockenfuss,
BY
ATTORNEY

July 31, 1951 W. WOCKENFUSS 2,562,250
ACCUMULATOR CONTROL FOR TABULATING MACHINES
Filed March 4, 1948 19 Sheets-Sheet 6
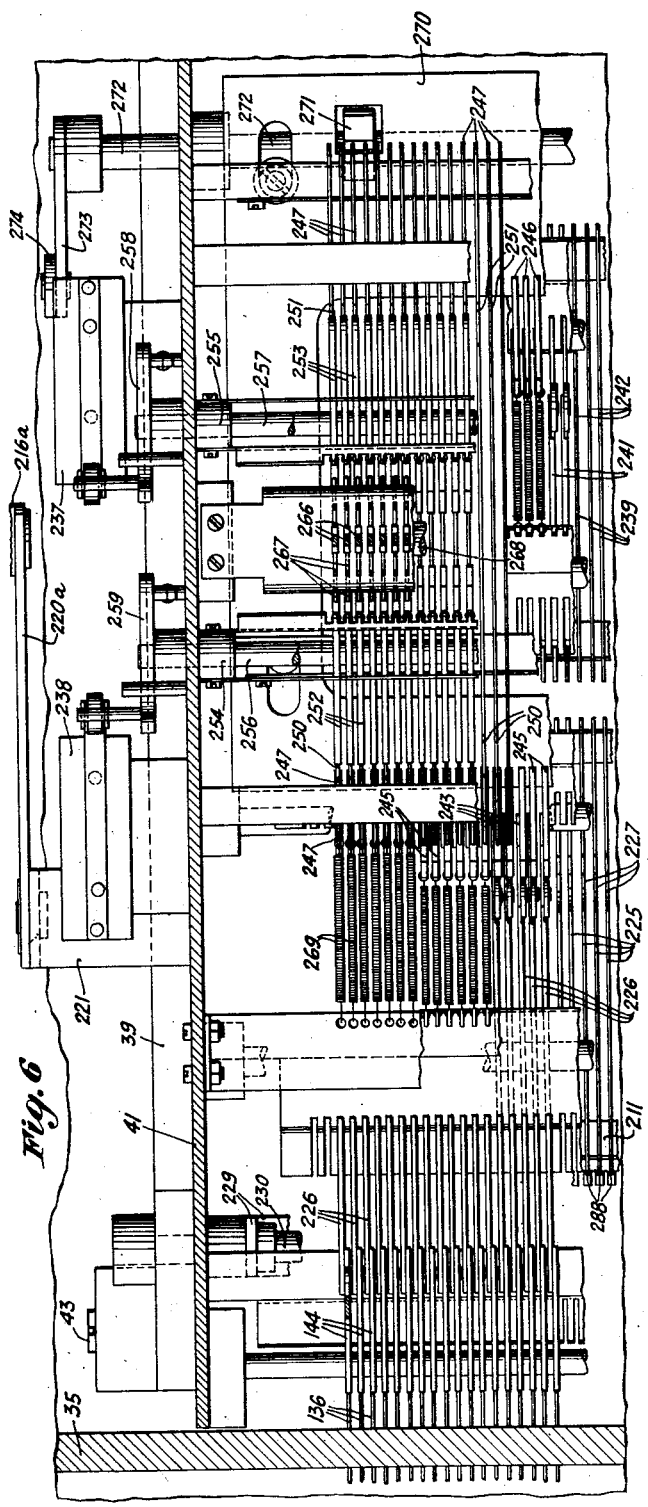
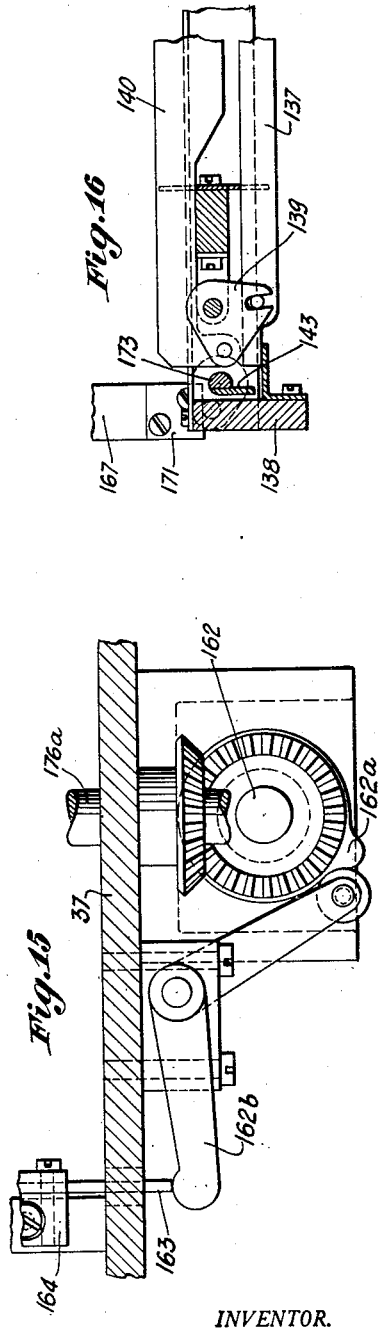
INVENTOR.
William Wockenfuss,
BY
Edward L. Mueller
ATTORNEY July 31, 1951  W. WOCKENFUSS  2,562,250
ACCUMULATOR CONTROL FOR TABULATING MACHINES
Filed March 4, 1948  19 Sheets-Sheet 7

INVENTOR.
William Wockenfuss,
BY
Edward L. Mueller
ATTORNEY

July 31, 1951 W. WOCKENFUSS 2,562,250
ACCUMULATOR CONTROL FOR TABULATING MACHINES
Filed March 4, 1948 19 Sheets-Sheet 8

INVENTOR.
*William Wockenfuss,*
BY
*Edward L. Mueller*
ATTORNEY

July 31, 1951 W. WOCKENFUSS 2,562,250
ACCUMULATOR CONTROL FOR TABULATING MACHINES
Filed March 4, 1948 19 Sheets-Sheet 11
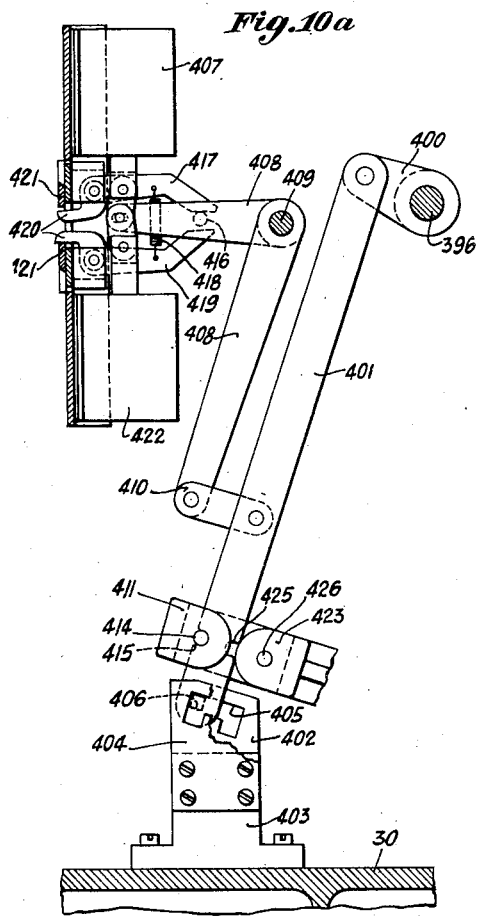
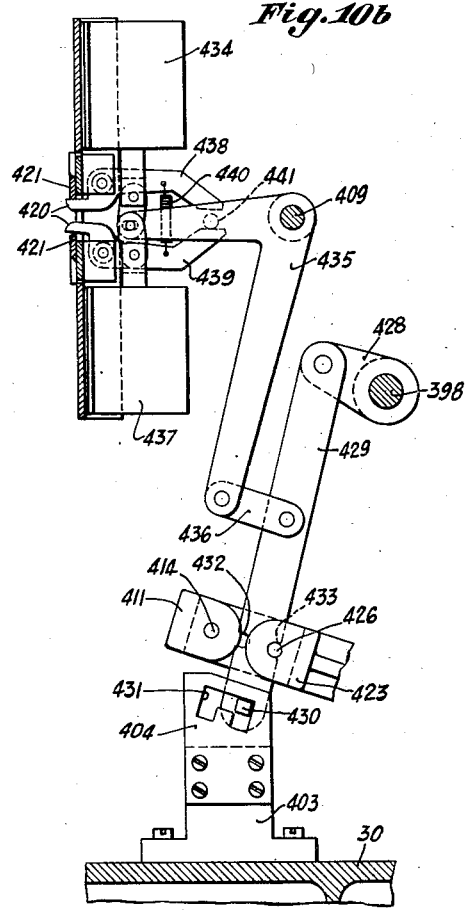
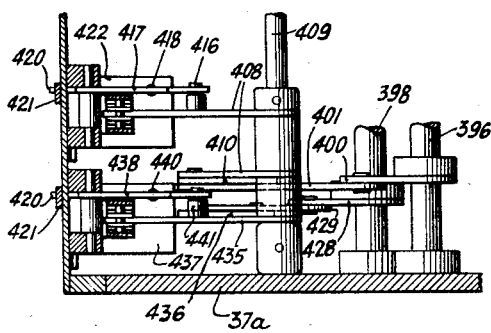
INVENTOR.
William Wockenfuss,
BY
ATTORNEY July 31, 1951 — W. WOCKENFUSS — 2,562,250
ACCUMULATOR CONTROL FOR TABULATING MACHINES
Filed March 4, 1948 — 19 Sheets-Sheet 12

INVENTOR.
William Wockenfuss,
BY Edward L. Mueller
ATTORNEY

July 31, 1951 W. WOCKENFUSS 2,562,250
ACCUMULATOR CONTROL FOR TABULATING MACHINES
Filed March 4, 1948 19 Sheets-Sheet 13

INVENTOR.
William Wockenfuss,
BY
ATTORNEY

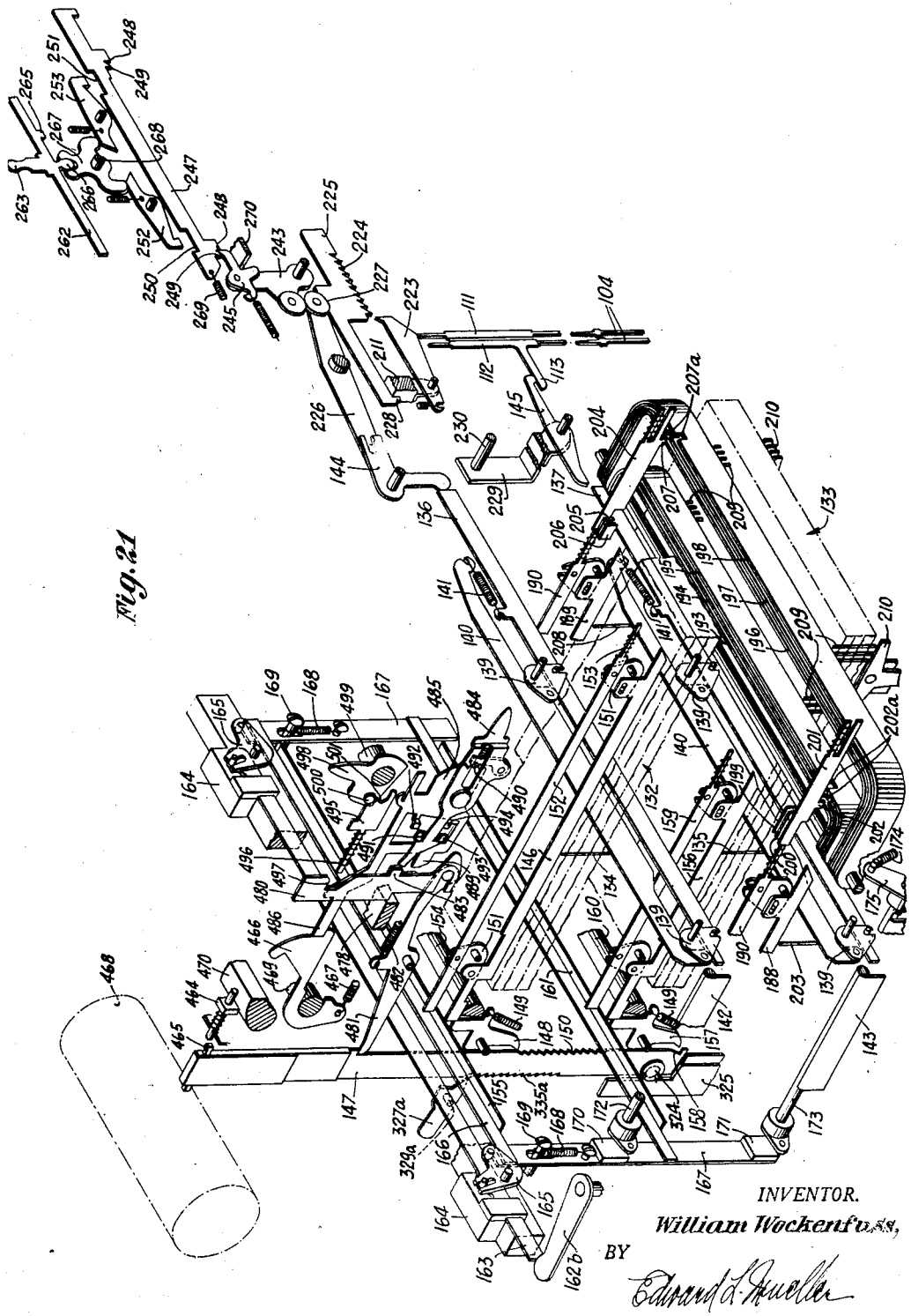

July 31, 1951 W. WOCKENFUSS 2,562,250
ACCUMULATOR CONTROL FOR TABULATING MACHINES
Filed March 4, 1948 19 Sheets-Sheet 15
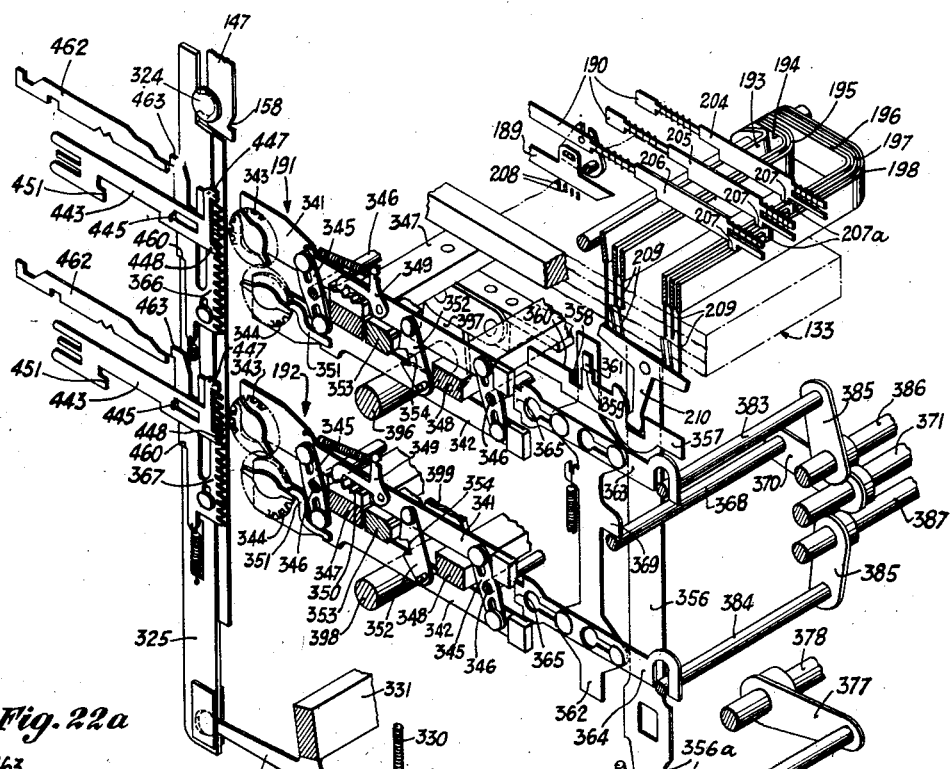
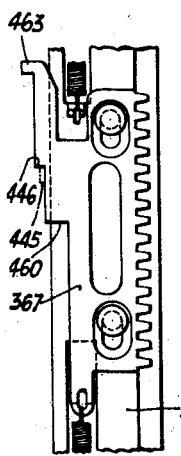
INVENTOR.
William Wockenfuss
BY
ATTORNEY

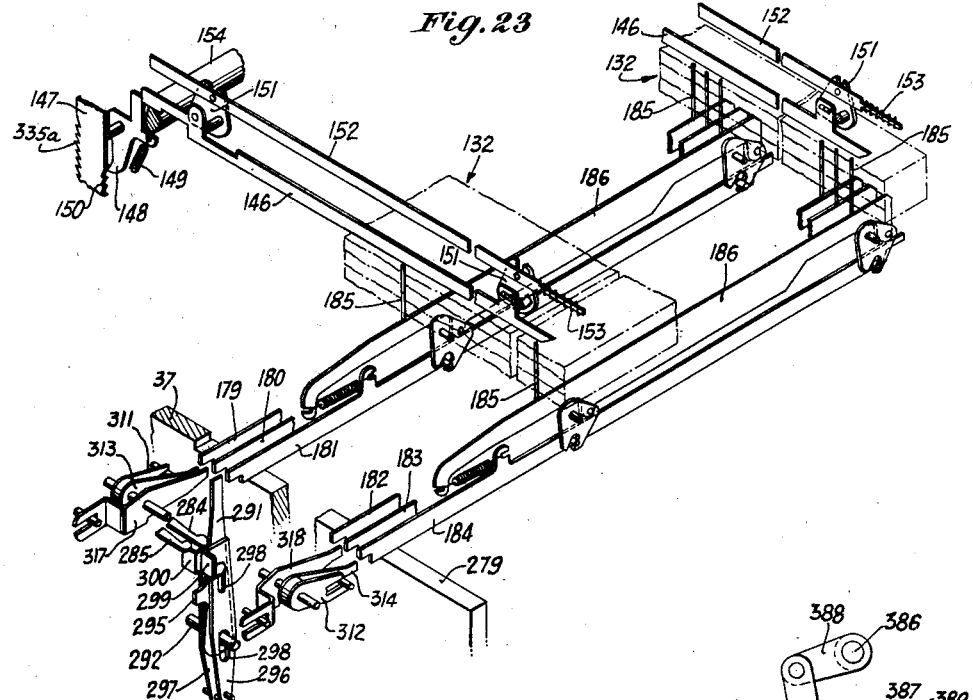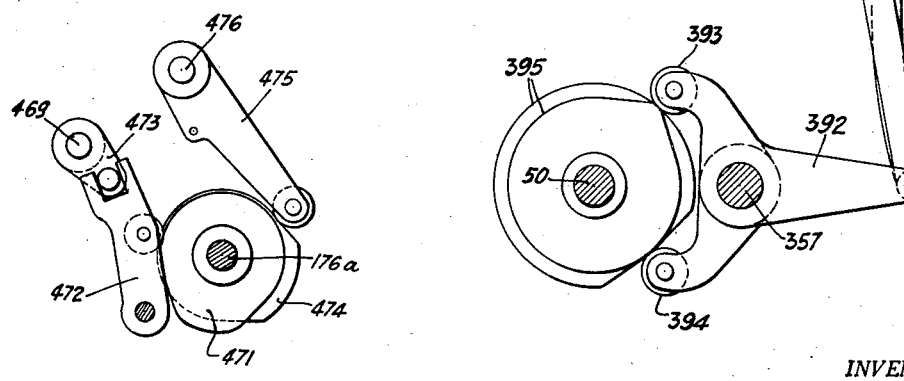

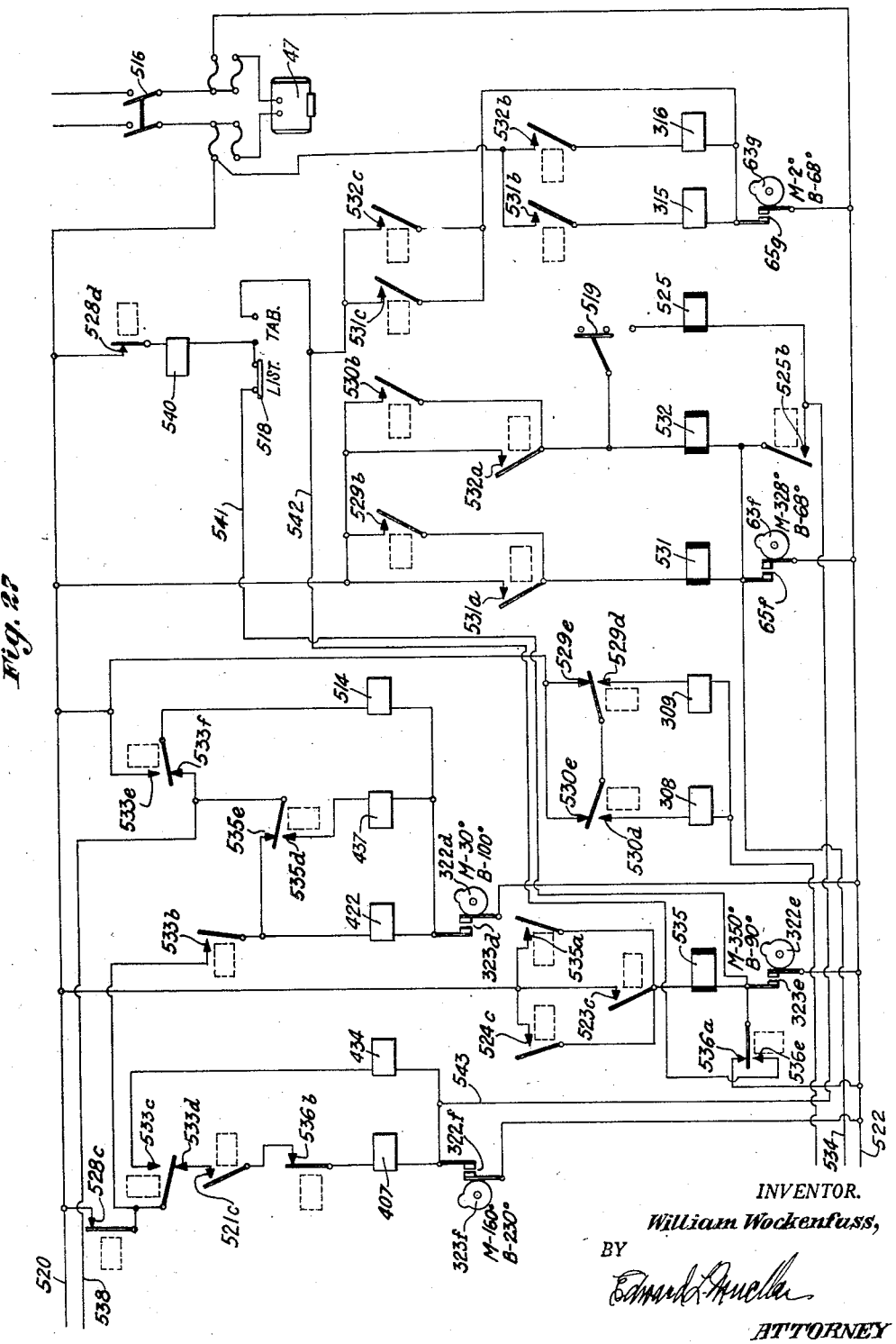

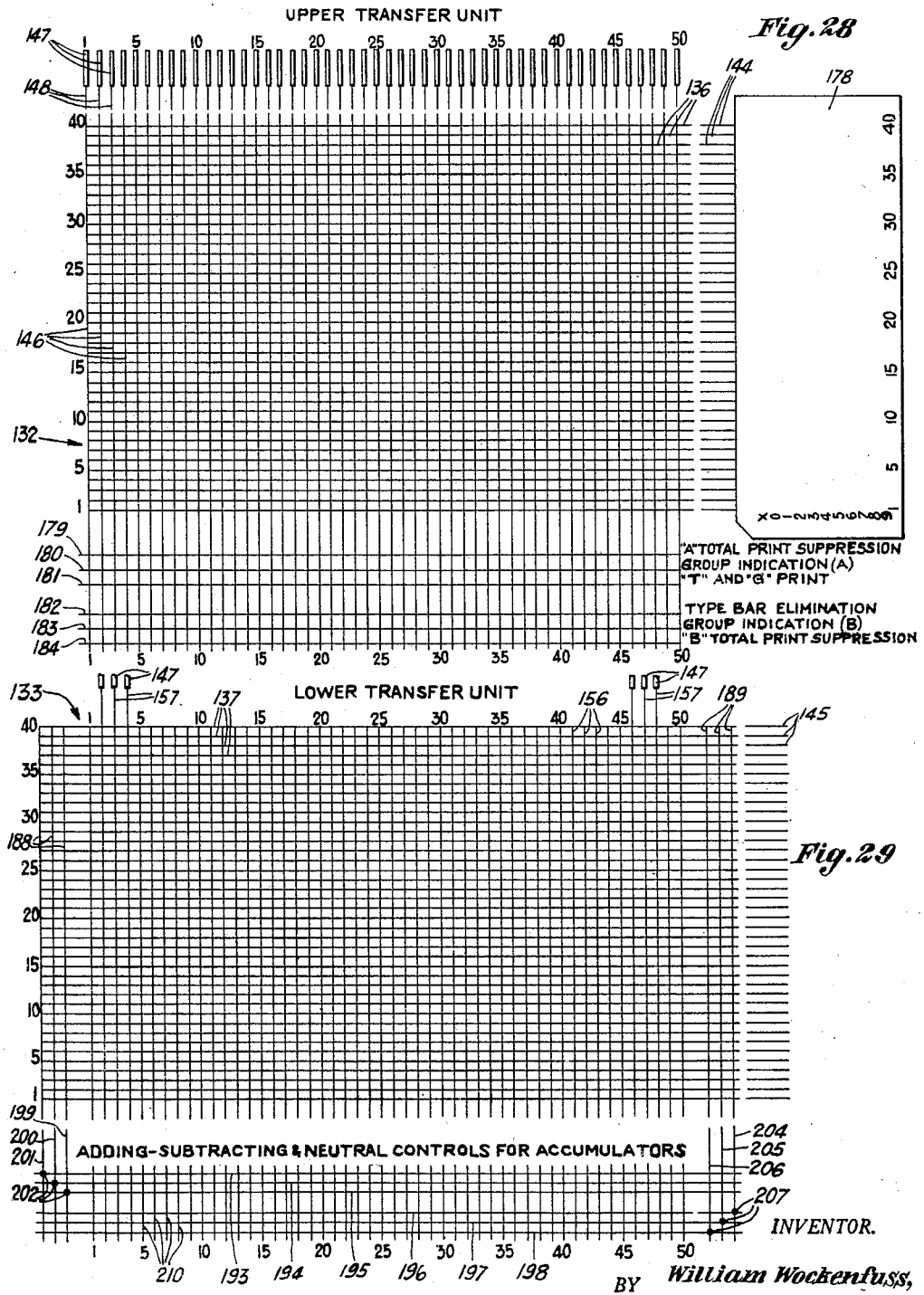

Patented July 31, 1951

2,562,250

UNITED STATES PATENT OFFICE 2,562,250

ACCUMULATOR CONTROL FOR TABULATING MACHINES

William Wockenfuss, Union, N. J., assignor to Control Instrument Company, Inc., Brooklyn, N. Y., a corporation of New York Application March 4, 1948, Serial No. 13,017

33 Claims. (Cl. 235—61.6)

This invention relates to improvements in statistical card controlled machines and has particular reference to a tabulator.

The machine herein disclosed is a further development of the tabulator shown in the copending application of W. Wockenfuss, Serial No. 676,520, filed June 13, 1946, wherein two transfer units are provided which are designed, through the medium of set-up devices therein, to accomplish different controls in the print section of the machine by utilizing the set-up devices to operatively position preselected transfer pins that are actuated from the card analyzing mechanism.

According to the present invention and among other features thereof, there is provided an improved accumulator control mechanism wherein a control member is selectively positioned relative to an accumulator and thereafter operated to adjust the accumulator to either adding, subtracting or neutral positions.

Another feature of the invention is to accomplish the various adjustments of the accumulator by the inclusion, in one of said transfer units and its set-up device, of an auxiliary control section which will in conformity with the appearance or non-appearance of a control hole in a card, effect the selective positioning of the above mentioned control member preliminary to its adjustment of the accumulator.

The inventive idea involved is capable of receiving a variety of expressions one of which, for purposes of illustration, is shown in the accompanying drawings; but it is to be expressly understood that said drawings are employed merely to facilitate the description of the invention as a whole and not to define the limits thereof, reference being had to the appended claims for this purpose.

In the drawings:

Fig. 6 is an enlarged horizontal section on the line 6—6 of Fig. 4;

Fig. 10a is a fragmentary elevation, partly in section, of the control mechanism for the upper, sub-total accumulators;

Fig. 10b is a similar view of the control mechanism for the lower, grand total accumulators;

Fig. 10c is a fragmentary plan view, partly in section and taken on the line 10c—10c of Fig. 9, of the sub and grand total accumulator control mechanism;

Fig. 15 is an enlarged plan view, partly in section, showing a portion of the control mechanism illustrated in Fig. 9;

Fig. 16 is a fragmentary sectional view of the lower transfer unit and a restoring means for elements thereof;

Fig. 17 is an enlarged elevation, with parts in section, of the card receiving or stacking mechanism;

Fig. 18 is a transverse section on the line 18—18 of Fig. 17;

Fig. 19 is an enlarged fragmentary section of the card feed magazine, taken on the line 19—19 of Fig. 4;

Fig. 20 is an enlarged fragmentary detail section of the card stop mechanism located in each of the sensing and analyzing stations;

Fig. 20a is a similar view of the card feed magazine, showing the stop feed control;

Fig. 20b is a sectional detail of a card sensing device located at each of the sensing and analyzing stations and shown in its operative position when actuated by a card;

Fig. 21 is a fragmentary isometric view of the upper and lower transfer units, the analyzer controls therefor and the mechanisms by which the type bars are controlled thereby;

Fig. 22 is a similar view of the accumulator and type bar control mechanisms;

Fig. 22a is an enlarged fragmentary plan view of a type bar and its accumulator rack, the latter being shown in its carryover position;

Fig. 22b is an enlarged fragmentary isometric view of the portion of the lower transfer unit shown in Fig. 22 and also illustrated in Fig. 8.

Fig. 23 is a fragmentary isometric view of the control mechanism for the auxiliary section of the upper transfer unit;

Fig. 24 is an elevation of a portion of the hammer control mechanism;

Fig. 25 is an elevation of a portion of the accumulator operating mechanism;

Figs. 26 and 27 are diagrammatic views of the circuits involved in the various machine operations;

Fig. 28 is a diagrammatic view of the upper transfer unit and certain associated parts; and Fig. 29 is a similar view of the lower transfer unit.

In the co-pending application of William Wockenfuss, Serial No. 676,520, filed June 13, 1946, there is disclosed and claimed a tabulator construction involving the use of two transfer units and a set-up device employed in conjunction with each of them to selectively control the operative and inoperative positions of transfer elements or pins forming a part of said unit and adapted, when in their operative positions, to transmit from the card analyzer to the recording instrumentalities of the machine, the data representing denominational values punched in the cards being analyzed.

The present machine is a further development of the tabulator shown in the aforementioned application and, among other features, embodies a novel automatic group control mechanism which, basically, utilizes the known principle of two mechanical sensing and analyzing stations at which cards are compared to sense changes of designation therein, and further accomplishes, in a unique manner, the differential control of the printing and accumulating mechanisms of the tabulator through the medium of set-up devices and transfer units similar to those disclosed in said application but modified thereover to control additional functions.

Figure 5:
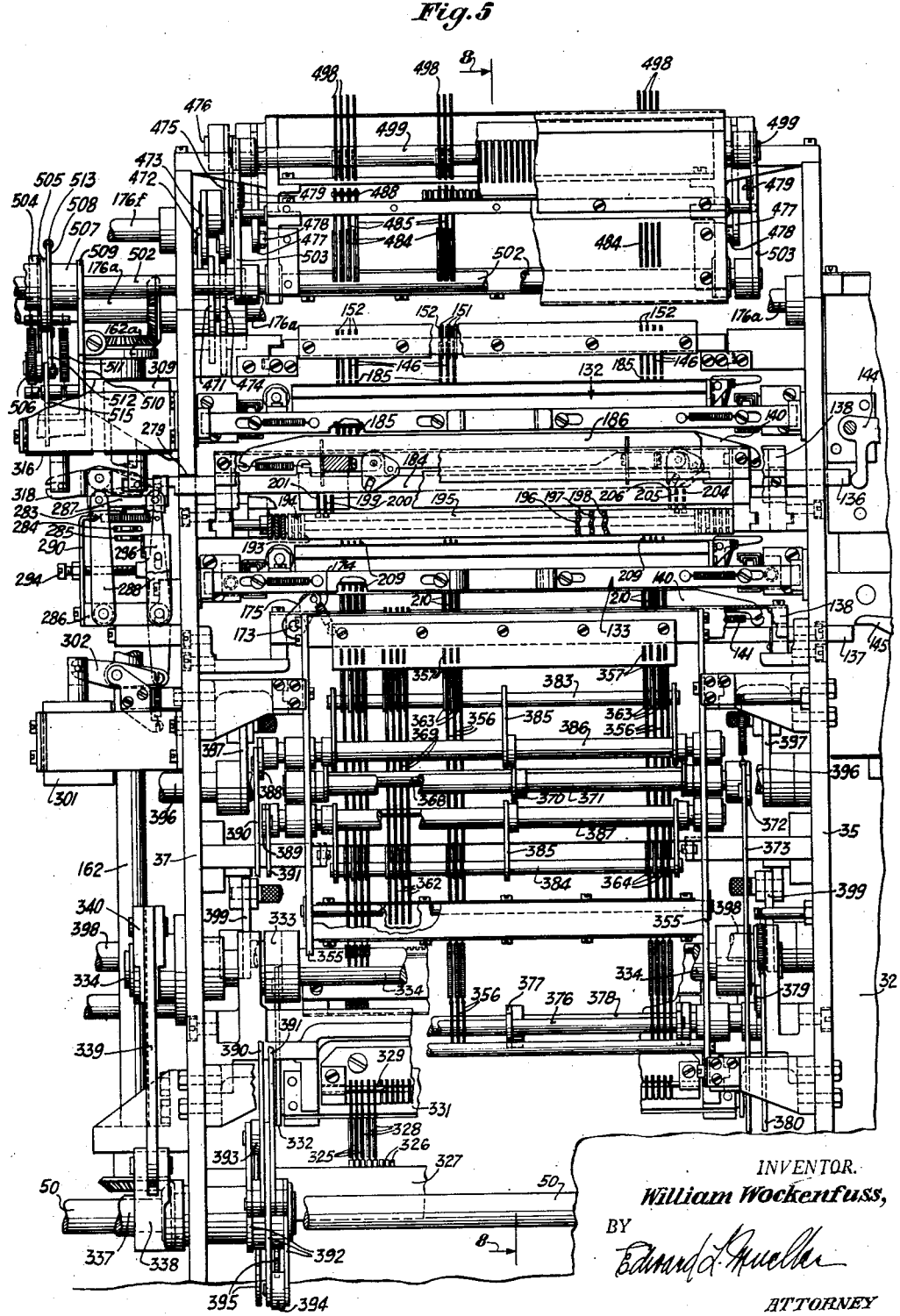
Fig. 5 is a front elevation of the printing section of the machine, with parts broken away.

Generally, the tabulator comprises a supporting base 30 from which extend upwardly the front and back side plates 31 and 32 of the analyzing section of the machine. Between said plates is mounted a sub-base 33 which supports a transverse wall 34 that combines with a similar wall 35 supported upon the base 30 to form a chamber 36 for receiving and stacking cards after their analysis. Said wall 35 separates the analyzing section of the machine from the tabulating section thereof which is mainly contained between the wall 35 and a similar wall 37 (Fig. 5). Pivotally connected, at 38, to the upper portions of the side plates 31 and 32, are the two rails 39 of an auxiliary frame which further comprises the side plates 40 and 41 and a cover plate 42, said pivotal connection permitting said auxiliary frame and the entire mechanism supported thereby to be swung upwardly to a substantially vertical position, after effecting certain disconnections to be later described, in order that ready access may be had to the interior of the analyzing section in the event of a card jam, or for other purposes. The auxiliary frame is held in its horizontal operative position by removable dowel screws 43 extending through the rails 39 and into the side plates 31, 32.

The main drive shaft 44 (Fig. 7) extends transversely of the machine directly above the base 30 and through the side plates 31, 32, and is coupled, through a friction overload clutch conventionally shown at 45, to a pulley 46 at one end of the shaft which is connected to the driving motor 47 (Fig. 27) mounted conveniently below said base. A worm 48 on the shaft constantly drives a gear 49 surrounding the primary cam shaft 50 of the tabulating section of the machine and is adapted to be coupled to said shaft by a well known type of clutch mechanism, generally indicated at 51, which is controlled by the intermittently operable print clutch solenoid 51a to drive said shaft through one revolution each time the solenoid is energized and to stop said shaft at the end of its revolution if the solenoid is not re-energized. Said shaft 44 is also connected, by gearing 52, to a continuously operating shaft 53 which extends upwardly along the rear side plate 32 and adjacent wall 35, and constitutes the driving power for the card feeding and analyzing section of the machine. The upper end of shaft 53 is geared, at 54 (Fig. 2) to the horizontal shaft 55 supported in bearings on the outside of the plate 32 and having a worm 56 thereon which constantly drives a large gear 57 (Fig. 7) which surrounds and is adapted to be coupled to one end of the transverse shaft 58 having bearings in the plates 31, 32 and operable to control the various functions of said feeding and analyzing section. The coupling of said gear and shaft 58 is accomplished through a clutch mechanism 59 (Fig. 2), similar to the clutch 51, controlled by the feed solenoid 59a which is intermittently energized and de-energized during each cycle of the machine as long as the feed and analysis of the cards is to continue, but which remains de-energized during a total-taking cycle so that said clutch will be effective to stop rotation of said shaft 58 to thereby discontinue operation of the feeding and analyzing mechanisms.

Figure 2:
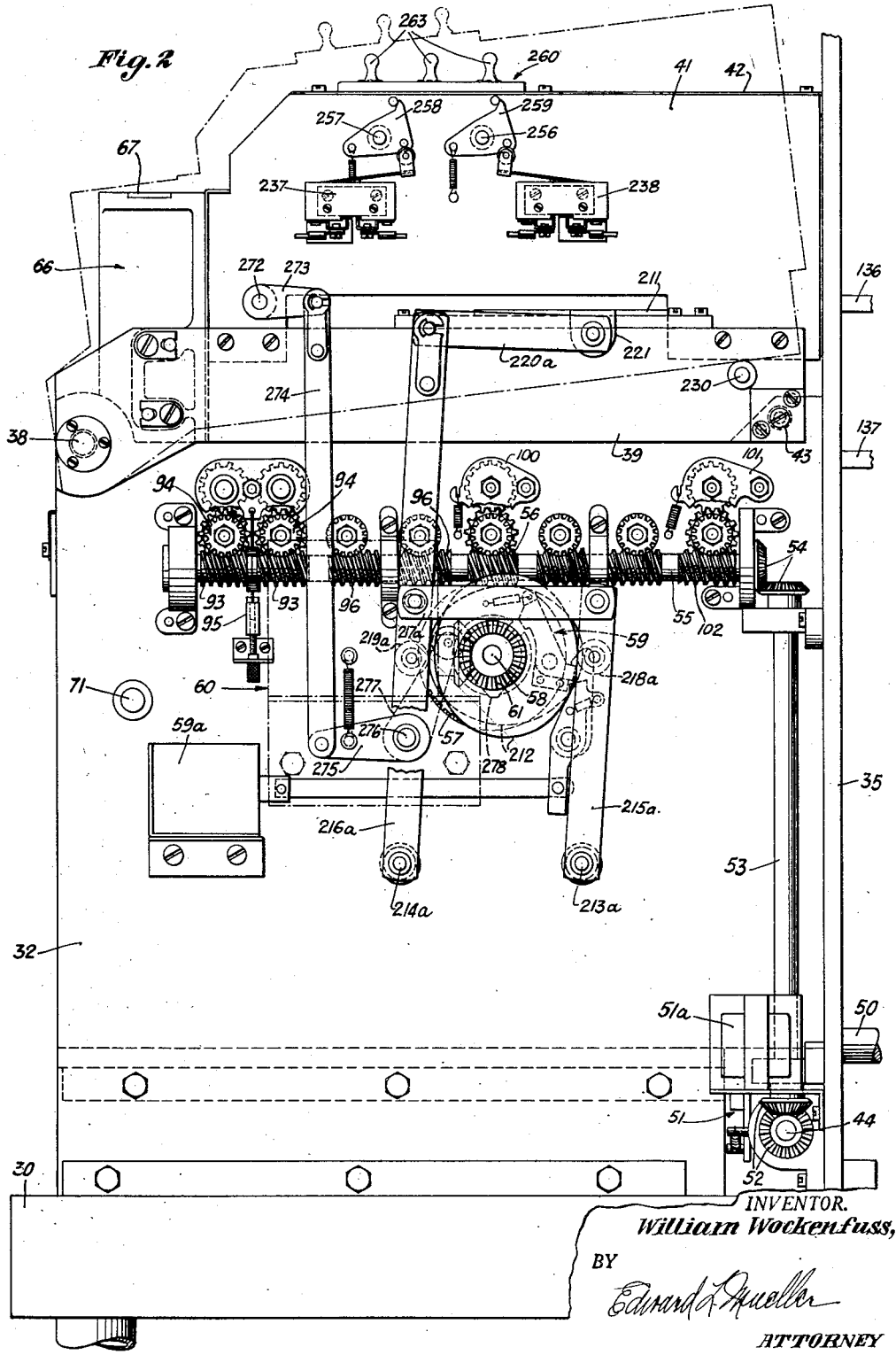
Fig. 2 is a rear elevation thereof.
Figure 7:
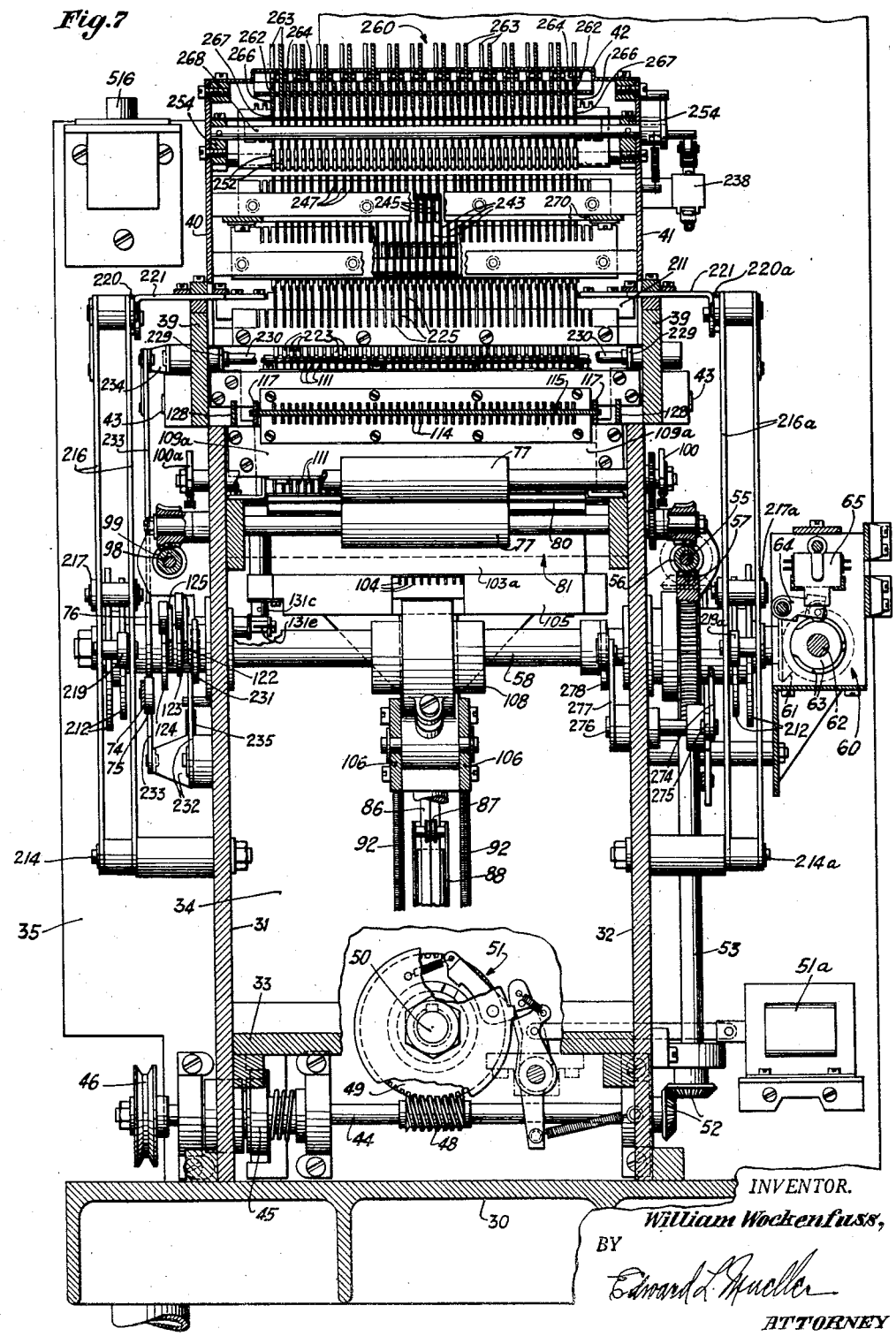
Fig. 7 is a transverse section through the analyzing section, taken on the line 7—7 of Fig. 4.
Figure 26:
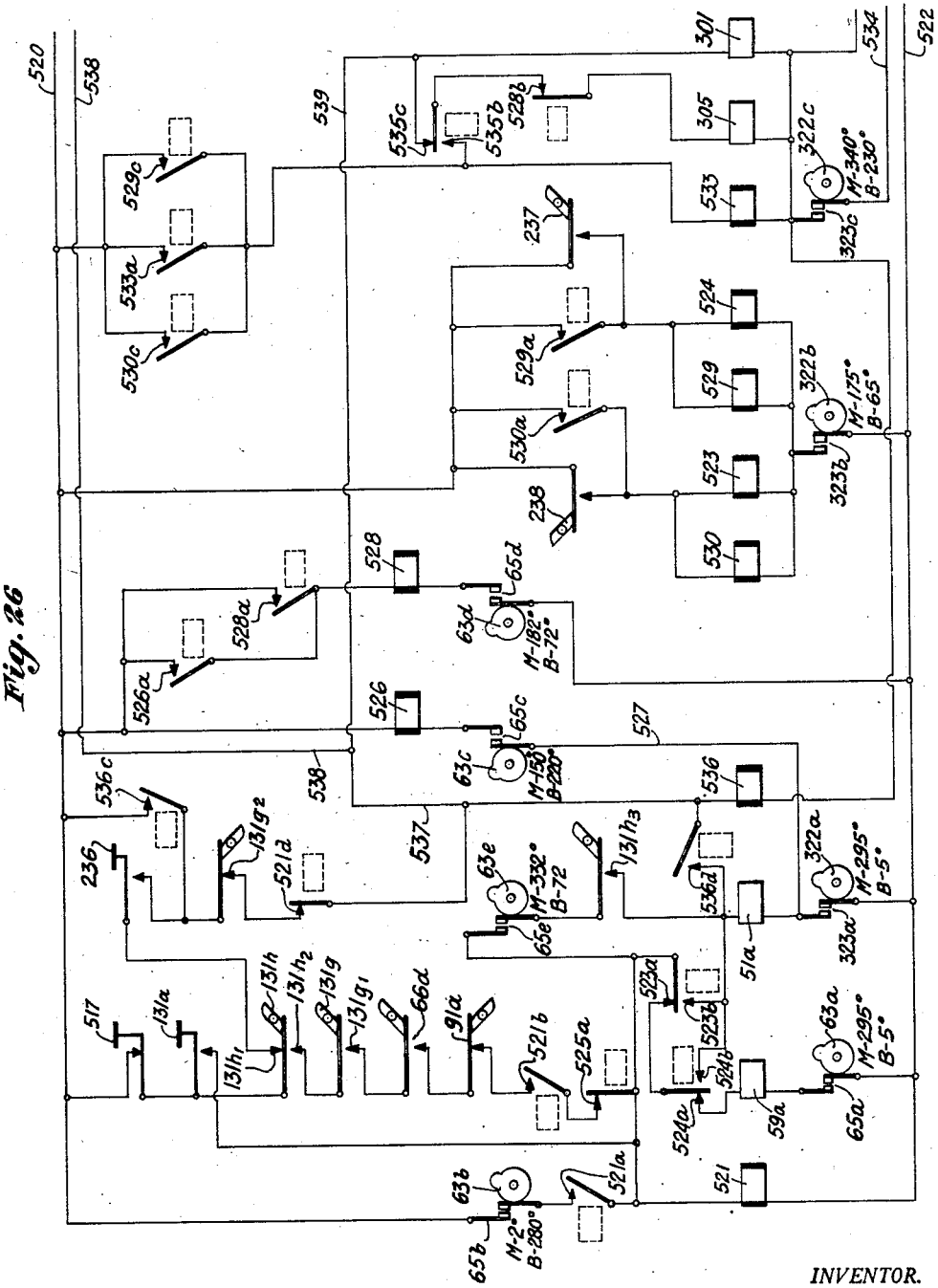

The switching unit 60, attached to the wall 32 and shown in dotted and full lines in Figs. 2 and 7 and which controls electrical circuits involved in various functions of the machine to be later described in connection with Figs. 26 and 27, is operated directly from the shaft 58 by a gear 61 which drives a cam shaft 62 in said unit 60. A plurality of cams generally indicated at 63 on said shaft 62 actuate individual switch arms 64 at different predetermined intervals to control the micro switches conventionally shown at 65 and included in said electrical circuits.

The opposed walls of the card magazine 66, which latter is attached to the rails 39 and is thus movable with the auxiliary frame, are provided with vertical guide strips 67 (Fig. 19) that extend the entire height of said walls with their upper ends fixed to the top of the magazine and their lower ends free to be flexed by adjusting screws 68 whereby the cards may be properly centered in the magazine and allowances made for minutes changes in the lengths of the cards caused by humidity variations.

Card feed mechanism

Cards are fed from the magazine 66 (Fig. 4) by a reciprocating picker 69 operated from the crank 70 on the rock shaft 71 which is connected through the crank 72 (Fig. 1) to a link 73 operated by the bell crank 74 having a follower 75 engaging with a cam 76 (Fig. 7) on the front end of the shaft 58. As successive cards leave the magazine (Fig. 4), they are carried along by pairs of feed rollers 77, first, into the card chamber 78 of a sensing station forming part of the analyzing mechanism and generally indicated at 79, then into the chamber 80 of the analyzing station 81 constituting the remainder of said mechanism, and thence to the discharge or stacker chamber 36, the cards at each station being held stationary by the stop members 82 during the sensing and analyzing of said cards.

In the stacker chamber 36 there is disposed a vertically movable platform 83 carrying a plate 84 upon which cards are deposited from the adjacent rollers 77, and said platform is guided in its movements by a slot 85 formed in the wall 34. As best shown in Figs. 17 and 18, the platform 83 has depending therefrom an elongated rod 86 which is guided between pairs of rollers 87 carried in a bracket 88 secured to the wall 34, and which extends downwardly through the base members 33 and 30 and carries at its lower extremity a cross piece 89 having a trip 90 to operate a switch contact 91 to release a normally closed microswitch 91a to thereby stop the feed of cards from the magazine 66 when the chamber 36 is full. The platform 83 is normally urged upwardly by a pair of coil springs 92 fixed at their upper ends to the wall 34 and connected at their lower ends to the cross piece 89.

The lower rollers 77 of the two pair adjacent the magazine 66 are positively driven by worms 93 on the shaft 55 meshing with gears 94 on the shafts of said rollers, and the upper rollers of said pairs are geared to the lower rollers and have adjustable tensioning devices 95 and 95a connected thereto. The next pair of rollers 77 are designed to have contact only with the edges of cards passing through the sensing station 79 and are geared to worms 96 on the shaft 55 and to worms 97 on the counter shaft 98 mounted on the side plate 31, and the pair of lower rollers associated with the analyzing station 81 are similarly geared to the two shafts 55, 98. The shaft of the lower roller of the pair between the two stations is driven from the worm 56 and, on the other side of the machine, drives the worm 99 on the shaft 98, and the upper roller of said pair is geared to its lower roller and maintained in driving connection therewith by tensioning devices 100, 100a on opposite sides of the machine. Similar devices 101, 101a, maintain the upper roller of the last pair adjacent the card stacker chamber 36 operatively connected to the lower roller of said pair which is driven by worm 102 on the shaft 55 and thus all sets of rollers are driven continuously during the operation of the machine.

The magazine 66 is provided with means operable, upon exhaustion of the cards therefrom, to automatically stop the machine by opening the circuit for the motor 47. Said means comprises a spring contact 66a (Fig. 20a) arranged adjacent one end of the bottom of the magazine and having a roller for contact with the lowermost card of the stack upon which is mounted the weight 66b provided with a recess 66c in its bottom located directly over said roller. As long as there is a card in the magazine, said weight and the bottom card of the stack will force said contact downwardly to maintain closed a micro switch 66d mounted directly below the magazine, and thus keep the motor circuit energized at this point. However, when the last card is fed from the magazine, the roller of the contact 66a will enter the recess 66c of said weight and, in so doing, will permit the switch 66d to open and thus break the motor circuit.

*Sensing and analyzing mechanisms*

The vertically reciprocating pin boxes 103, 103a (Fig. 4) of the sensing and analyzing stations 79, 81 are of identical construction with the exception, for control purposes, that the latter pin box mounts one more sensing pin 104 in each row individual to a card column than the box 103. Said pin boxes are supported by castings 105 connected by cross plates 106 and have their lower extremities guided in standards 107. An eccentric 108 on the shaft 58 is coupled to the plates 106 so as to reciprocate the pin boxes in unison during rotation of said shaft. Stations 79, 81 further comprise upper pin boxes 109, 109a supported in position above the boxes 103, 103a by the rails 39 so as to be movable with the latter and carry with them the card stops 82 when the auxiliary frame of which the rails 39 form a part is swung to open position wherein it will now be apparent that the rollers 77 and the card chambers 78, 80 will be fully exposed so that easy access may be had thereto in case of repair or a card jam. Rows of pins 110 and 111, equal to the number of columns in the cards, are mounted in the upper pin boxes 109, 109a, and are vertically aligned with the respective rows of pins 104 in the lower boxes. In addition, the pin box 109a has, in each row of pins 111, a control pin 112 adapted to be operated by the additional pin 104 in the corresponding row of the associated pin box 103a, and said pin 112 is provided with an extension 113 utilized in connection with the control or X position at the head of each card column. Lock plates 114 in the two upper pin boxes 109, 109a are provided for each row of pins 110, 111, 112 to momentarily hold those pins elevated, during the sensing and analyzing operations, which have been raised by the sensing of holes in a card by pins 104 in the lower pin boxes. The plates 114 are under the combined control of cross bails 115, each common to the plates in one of the upper pin boxes, and of individual spring urged bell cranks 116 each of which tends to move its plate 114 to the right, as viewed in Fig. 4. The bails 115 are carried by two bars 117 (Fig. 7) on opposite sides of the boxes 109, 109a and these bars are actuated, immediately following the elevation of the pins 110, 111, by cranks 118 at opposite ends of a rock shaft 119 supported in the rails 39. Such actuation moves the bails to the right and thus permits the bell cranks 116 to shift the lock plates into locking position relative to the elevated pins 110, 111. Said lock plates remain in operative position until the bails 115 are returned to restore said plates and thereby release the elevated pins following the performance of their functions. The shaft 119 carries a crank 120 (Fig. 1) to which is detachably connected a link 121 joined to a lever 122 (Fig. 7) operated by a cam 123 on the shaft 58 to control the reciprocating movements of the bails 115.

Figure 1:
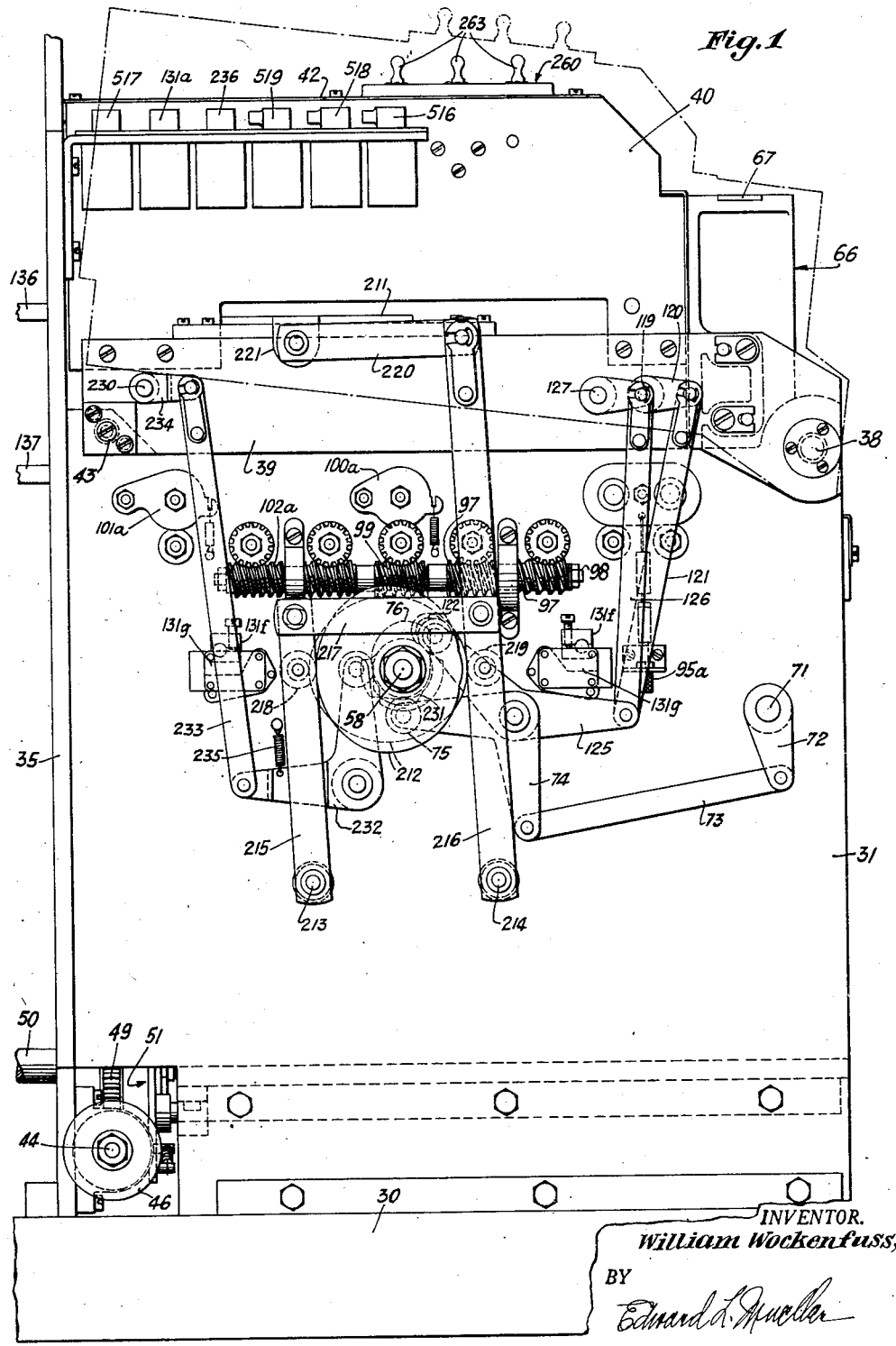
Fig. 1 is a front elevation of the analyzing section of the machine.

The card stops 82 are controlled from a cam 124 on the shaft 58 engaging a lever 125 which is directly in front of the lever 122, as seen in Fig. 1. A link 126 detachably connects the lever 125 to a rock shaft 127 to which are joined, by cranks, adjacent ends of two bars 128 (Figs. 4, 7 and 20) the other ends and intermediate portions of which are diagonally slotted at 129 to receive pins 130 carried by the slidable plate 131 on each pin box 109, 109a and which carries a stop 82 associated with the adjacent pin box. Through this linkage, cam 124 operates the two bars 128 to simultaneously raise the card stops 82 upon retraction of the sensing pins 104 so that the cards temporarily held in the chambers 78 and 80 will be discharged therefrom by the continuously driven rollers 77, after which the stops are again lowered by the cam 124 to stop the succeeding cards entering said chambers during the next cycle of operation.

After the motor 47 has been energized, the machine operation is initiated by depressing the start key 131a (Figs. 1 and 26) to thereby energize the feed clutch solenoid 59a which then permits the clutch 59 to become effective to drive the shaft 58. Said solenoid is de-energized during each revolution of said shaft but is re-energized before de-clutching of the shaft can take place, as long as the feed of the cards is to continue. The key 131a is held depressed to maintain the starting circuit closed for two machine cycles to thus allow two cards to be fed from the magazine and to the stations 79, 81, which would not otherwise occur because of card sensing devices at said stations that operate, in the absence of a card at either station, to stop the machine. Each of said devices (Figs. 7 and 20b) includes a card sensing pin 131b carried by the movable pin box at its station and adapted to sense the presence or absence of a card thereat. Said pin 131b is supported by a plunger 131c movable in the casting 105 and which is normally urged upwardly by the coil spring 131d, and the lower end of said plunger is positioned directly over and movable relative to the free end of a contact arm 131e rockingly supported in the block 131f carried by a multi-contact micro switch. When pin 131b does not engage a card, the plunger 131c moves upwardly and out of engagement with the arm 131e and the various contacts of the associate switch 131g or 131h assume the normal positions shown in Fig. 26 wherein each switch is shown in two sections for purposes of convenience in illustrating the circuit to be later described in detail. As each plunger 131c moves downwardly, its collar 131j will contact and flex the arm 131e, thus reversing the normal condition of the various switch contacts and if, upon the next upward movement of said plunger, the pin 131b engages a card, as shown in Fig. 20b, said upward movement of the plunger will be arrested with its collar still contacting the arm 131e to retain the latter in its operated position. Therefore, the contacts controlled by said arm will be held in their reversed positions as long as a pin is in sensing position, and as the pin box casting 105 again recedes, the plate 131k thereon will contact the collar 131j to lower the plunger 131c and its pin 131b sufficiently to allow the card just sensed to be fed from the card chamber.

The switches at the two stations are in series with the energizing circuit which controls the print clutch solenoid 51a; hence, cards must be present at both stations 79, 81 and both switches 131g and 131h must be closed before the start key is released in order that said solenoid 51a may be energized to couple the shafts 44 and 50 and thereby effect operation of the printing and accumulating section of the machine. Also, as will later appear in detail, with the first card of a run at station 79 but none at station 81, a non-comparing condition will exist which, when sensed during the first cycle, will cause the group control mechanism to operate and thus prepare the machine for a total-taking operation on the next cycle by preventing the feed solenoid from energizing to thereby stop further feeding operation and by causing the print solenoid 51a to be energized to drive the shaft 50. During said first cycle and with the print clutch solenoid 51a de-energized, the print section of the machine remains inoperative since the shaft 50 will not yet be coupled to the shaft 44, but when a change of designation takes place and the shaft 50 is driven through the next cycle, it will raise the type bars to their extreme or blank positions so that no printing will result. Also, the accumulators are suppressed in this cycle due to the circuit arrangement and no accumulation takes place. Subsequently, the machine enters its third cycle with cards at both stations 79, 81 and normal operation then proceeds in a manner which will be understood from the following description.

*Scanning device for upper pin boxes*

This device is constructed and operated substantially like the scanning device in said copending application, the principal difference being that the frame 211 thereof is enlarged and certain parts are duplicated to provide for the scanning of the pins 110 in the upper pin box 109 of the sensing station 79 at which cards are compared with those at station 81 to sense a change of designation and to initiate the operation of the group control mechanism in case punched code designations in the cards at the two stations do not compare, as will be later described in detail.

The frame 211, which is mounted over the pin boxes 109, 109a, is reciprocated in timed relation to the analysis and sensing of the cards at the two stations and its movement is under the control of two pairs of complementary cams 212 (Figs. 1, 2 and 7) at opposite ends of the shaft 58. On opposite sides of the machine and on opposed sides of each pair of cams there are fulcrumed at 213, 213a and 214, 214a, to each of the side plates 31 and 32, the pairs of short and long levers 215, 216 and 215a, 216a connected by the cross links 217 and 217a. The pairs of levers 215, 215a on opposite sides of the machine carry rollers 218, 218a, each engaging with one of the adjacent cams 212, while rollers 219, 219a on the pairs of levers 216, 216a engage the adjacent complementary cams so that as the two sets of cams are rotated by the shaft 58 the described leverage will oscillate about the fulcrums 213, 213a and 214, 214a. The upper ends of the two pairs of levers 216, 216a on opposite sides of the machine are detachably and pivotally connected to links 220, 220a which join said levers to the extensions 221 on opposite sides of the scanning frame 211 so as to reciprocate the same.

Figure 4:
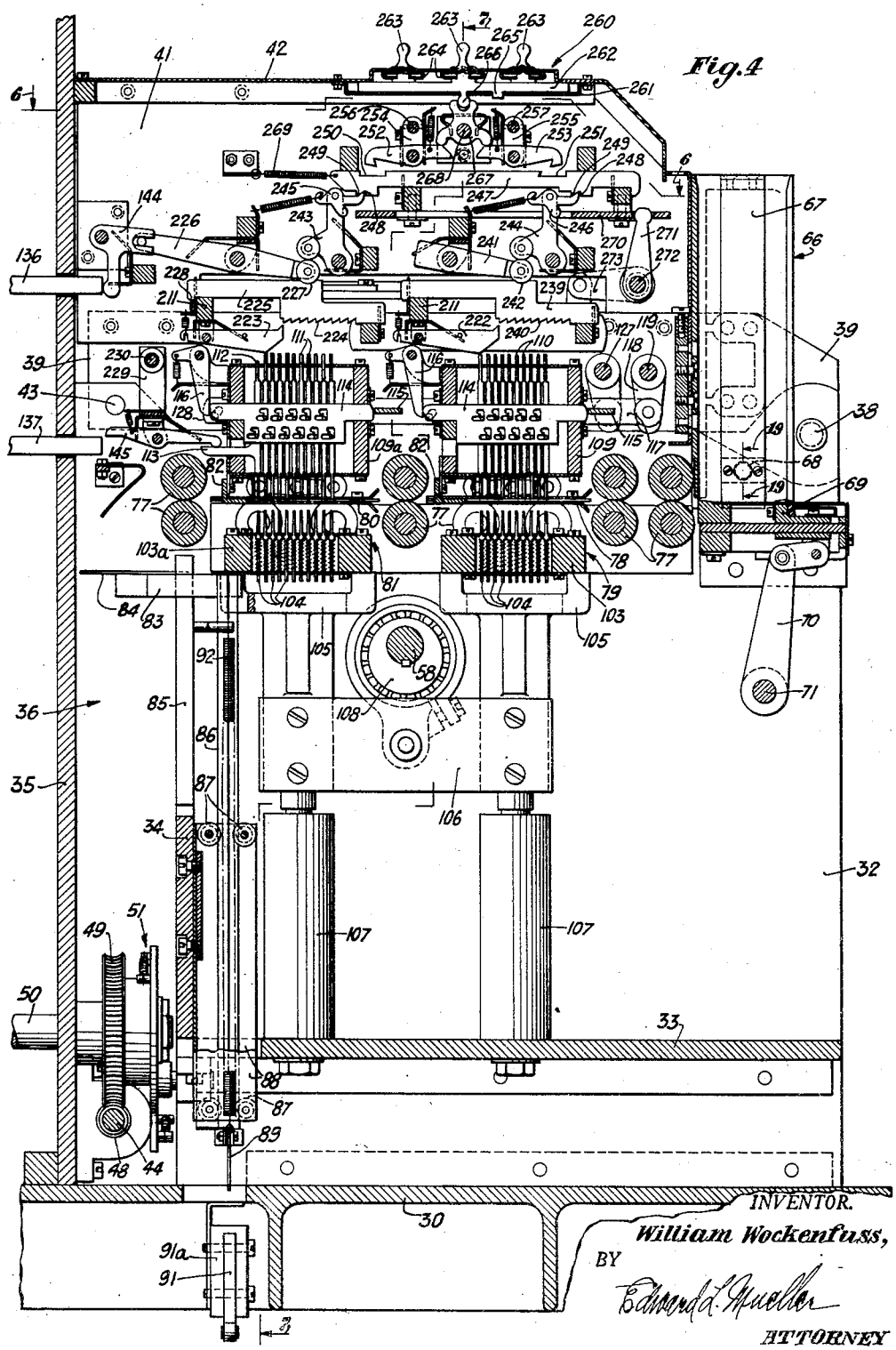
Fig. 4 is a vertical longitudinal section on the line 4—4 of Fig. 3.

The elevation and locking of pins 110 and 111 in the units 79, 81, as a result of the operative strokes of the pin boxes 109, 109a, is immediately followed by the right hand movement, as viewed in Fig. 4, of the scanning device which now functions to sense any locked pins 110, 111 and to transmit data represented by the latter pins through an analyzer controlled mechanism. This sensing is accomplished, with respect to the pins 110, by operating pawls 222, one for each row of pins, pivotally mounted in the scanning frame 211 for operation in connection with the automatic group control mechanism. Similar pawls 223 also forming part of said analyzer controlled mechanism and supported in the frame 211 move over the pins 111 in the pin box 109a and wherever a pawl encounters an elevated pin, said pawl will be raised to engage the corresponding tooth of its associated slide 225 which, until such engagement, remains stationary with respect to the frame 211. However, when said slide is so engaged, it will move with the scanning frame to the end of its stroke and, in so doing, its initial movement will rock the associated lever 226 due to the recess 227 in the upper edge of the slide in which one end of said lever normally rests. This movement of the lever will rock the bell crank 144 individual thereto so as to operate the associated actuating bar 136 which forms part of the analyzer controlled mechanism for the upper transfer unit 132 (Fig. 5) presently to be described. After all the pins 111 have been scanned and the data represented thereby has been transmitted to the unit 132 by the various operated bars 136, the scanning frame returns to its starting position and, during this secondary stroke, restores the operated slides 225, and also the slides 239 later to be described, by engagement of portions of the frame with the lips 228 of said slides, whereupon all operated levers 226 and bell cranks 144 will also be restored by a subsequent action which takes place in the control of the bars 136.

When an X hole is sensed at the station 81 by the additional pin 104 in the pin box 103a, its corresponding control pin 112 is elevated, but this pin being shorter than the pins 111, will not be contacted by the pawl 223 thereabove. The raising of said pin 112 causes its extension 113 to engage the adjacent end of its associated lever 145 pivotally mounted in the swinging bail 229 so that the opposite end of said lever will align itself with the associated actuating bar 137 of the analyzer controlled mechanism for the lower transfer unit 133, whereupon the bail 229 is swung to the left as viewed in Fig. 4, to cause any of the operated levers 145 to impart linear movement to the respective bars 137 with which they are aligned while any unactuated levers 145 will pass over their bars. This action takes place before the scanning device starts its primary movement so as to enable any operated bar 137 to effect the suppression of an associated type bar before it can start its upward travel in timed relation to the movement of the scanning device, or to perform other functions, later to be described, which are controlled by the appearance of an X hole.

The bail 229 common to all the levers 145 is rockingly supported on the shaft 230 extending between the rails 39 and said shaft is controlled by a cam 231 (Fig. 7) mounted on the shaft 58. Said cam is engaged by one end of the bell crank 232 (Fig. 1) pivoted on the side plate 31, to the other end of which is connected the lower extremity of the link 233; and the upper end of said link is detachably connected to a crank 234 carried by said rock shaft 230. After its operation by the cam 231, the bail 229 and the associated parts are restored by the spring 235 connected to the bell crank 232, and the actuated bars 137 are subsequently restored by the bail 143 (Fig. 21) in a manner to presently appear.

*Transfer units*

As in the previously mentioned patent application, the pins 111, 112 of the pin box 109a are designed, respectively, to control the operations of the upper and lower transfer units generally indicated at 132 and 133 in Figs. 5 and 21, and which are slidably mounted between the walls 35 and 37 so that the same may be withdrawn outwardly and opened for the removal and insertion of different set-up devices each individual to a particular type of report analysis and each of which controls the operative and inoperative positions of the lower sections of the rows of sectional transfer pins generally indicated at 134, 135 in the respective units, as fully described in said application. In connection with the accumulator control hereinafter to be described in detail, the lower transfer unit 133 is provided, as diagrammatically shown in Fig. 29, with an auxiliary control section instrumental in effecting the adjustment of the accumulators to add, subtract or neutral positions, and a portion of said unit 133 embodying said control section is illustrated in Fig. 22b later specifically described.

As distinguished from the disclosure in the aforementioned application wherein the operative transfer pins are elevated to perform their functions by direct contact therewith of a plurality of actuating bars associated with the upper and lower transfer units and having linear and vertical movements under the influence of the card analyzer, the present invention provides that the previously mentioned actuating bars 136 and 137 associated, respectively, with the upper and lower transfer units have only linear movements responsive to the elevation of pins 111 or 112 in the analyzer unit 81. Each set of the bars 136, 137, in which there is a bar for each card column, is carried in a frame 138 secured between the walls 35, 37 and each bar is, as best shown in Fig. 21, connected by links 139 to an associated transfer pin elevating bar 140 in such manner that a linear movement of a bar 136 or 137 will impart to its bar 140 a practically direct upward movement which will avoid wear between the upper edge of the latter bar and the transfer pins 134 or 135 with which it is in engagement. Restoration of the bars 136, 137, and therefore the bars 140, may be accomplished by springs 141 connecting each pair of bars and, in order to provide a more positive restoration to insure that none of the bars 140 in either set will be in the path of horizontal movements of the transfer pins 134, 135 when either transfer unit 132 or 133 is withdrawn outwardly from its operative position, restoring bails 142 and 143 located at the left hand extremities of said bars 136 and 137 are adapted to be operated, in a manner to later appear, to reverse the initial linear movements of said bars to return them to normal. In so doing, the links 139 will operate to positively lower both sets of bars 140 so that their upper edges will be below the lower extremities of the transfer pins in the respective units 132, 133 with which they are associated. The restoration of the actuated bars 136 to normal will cause them to also restore the bell cranks 144 and their associated levers 226, this restoration occurring after the scanning frame 211 has completed its secondary movement and has returned to its starting position, as previously described.

*Main type bar control by transfer units*

Cooperating with the lower bars 136 of the upper transfer unit 132 is a set of control bars 146 arranged in crossed relation to the bars 136, 140, there being one bar 146 for each of the vertically movable type bars 147 in the machine, and each bar 146 is located directly over and in contact with a column of pins 134 so as to be elevated by any active pin in said column when the lower bar 140 engageable with said pin is raised. The elevation of a bar 146 takes place immediately upon the sensing of a hole in a card by a pawl 223 at the analyzing station 81 and during the upward movement of the type bars 147. Elevation of said bar 146 disengages it from the associated type bar-arresting pawl 148 so that the latter will, under the influence of its spring 149, engage the proper tooth 150 of its type bar so as to arrest the same in position to print the value represented by said tooth when the printing mechanism of the machine is operated. Each bar 146 is connected by links 151 to a slidable bar 152 having a spring 153 thereon which is compressed by the elevation of said bar 146 and the resulting sliding movement of the bar 152, and said spring later acts to restore the bars 152 and 146 just prior to the restoration of the pawl 148 by an oscillatory bail 154 upon which the adjacent ends of the bars 146 rest and which is common to all said pawls. To insure a more positive lowering of the bars 146, a vertically movable bail 155 common to and located above said bars and co-acting with the springs 153, is lowered at the proper moment in the cycle of operation to engage and force said bars downwardly to the position in which they will be engaged by the pawls 148, which have already been restored by the bail 154, to withhold said pawls from the teeth 150.

A similar arrangement for the lower transfer unit 133 includes the upper cross bars 156 engageable with the transfer pins 135 and which control, by their elevation under the influence of said pins, the release of the lower type bar-arresting pawls 157 for engagement each with the tooth 158 at the lower end of its associated type bar, and each of said bars 156 is linked to a bar 159 similar to the bars 152. A bail 160, similar to the bail 154 and operated therewith, restores all operated pawls 157; and a bail 161, like the bail 155 and also operated therewith, provides for the positive restoration of the lower control bars 156.

As shown in Figs. 15, 16 and 21, the restoring bails 142, 143, 155 and 161 are all controlled from the secondary cam shaft 162 geared to the main cam shaft 50 and which carries adjacent its upper end a cam 162a that operates a lever 162b, and when said lever is operated it shifts a slide 163 (Fig. 21) mounted in stationary blocks 164 adjacent opposite ends of the slide. Links 165 controlled by said slide depress a frame 166 having depending arms 167 at each end thereof and which frame carries the two bails 155 and 161 so that they will be lowered with the frame to perform their respective restoring functions. The downward movement of the frame 166 is against the tension of springs 168 connecting the arms 167 to fixed pins 169 so that said frame will be raised at the conclusion of the restoring operation and thus reverse the movements of the slide 163 and lever 162b. Abutments 170 and 171 on one of the arms 167 turn the shafts 172 and 173 which carry, respectively, the bails 142 and 143 so that the latter will be operated to restore the bars 136 and 137 when the frame 166 is lowered. Upon upward movement of said frame, the shaft 173 and its bail 143 are restored by a spring 174 connected to a crank 175 on one end of said shaft, and the shaft 172 and its bail 142 are restored by a similar spring urged crank 176, shown in dotted lines in Figs. 8 and 9.

The oscillatory restoring bails 154 and 160 for the type bar pawls 148 and 157 are controlled from the countershaft 176a (see Figs. 9 and 10) which is journaled in the walls 35, 37 and 37a and is geared to the upper end of the cam shaft 162. A cam 176b on the shaft 176a causes the rise and fall of an arm 176c secured on a rock shaft 176f and having its free end joined to the depending links 176d and 176e connected, respectively, to the extensions 154a and 160a of the bails 154 and 160. This assemblage operates to rock said bails to restore the pawls 148 and 157 at the instant before the vertically movable bails 155 and 161 operate to lower the control bars 146 and 156 to thus enable the latter to re-engage said pawls to retain them in non-arresting position until the next cycle of operation.

*Auxiliary controls by upper transfer unit*

Thus far, it is apparent that with respect to the upper transfer unit 132, the number of analyzer controlled bars 136 associated therewith is equal to the number of columns in a card and that there is a control bar 146 for every type bar 147, which bars 136 and 146 are utilized for the transmission of data interpreted from the cards by the analyzer unit 81. It will also be understood that, within the transfer unit 132, there is a sectional transfer pin 134 at each point of intersection of the crossed bars 136, 146, which pins are adapted to be adjusted to operative or active position or permitted to remain inoperative under the control of the set-up device or plate previously mentioned and shown at 177 in Fig. 8, which plate is of the same general construction as illustrated in Fig. 22b.

Referring now to Fig. 28 wherein a card 178 is shown in association with the upper transfer unit so as to illustrate the actual relationship of the parts during the machine operation, and in which some of the parts thus far described are illustrated diagrammatically, it will be seen that, in addition to the bars 136 which are associated with the main section of said unit, there is provided an auxiliary control section including two groups of similar bars 179, 180, 181 and 182, 183, 184 (see also Figs. 5, 8 and 23) which cooperate with crossed bars 146 to effect various functions designated in Fig. 28 in connection with the control of the type bars during a total-taking cycle and in accordance with the disposition of activated transfer pins 185 (Figs. 8 and 23) along said bars 179 to 184 at points of intersection of the crossed bars 146 therewith. The mechanism shown in Figs. 10 to 12 for operating the bars 179 to 184 to control the various functions will be later described, it being sufficient at this point to briefly set forth the manner in which said functions are initiated through the upper transfer unit.

The bars 179 and 184 are assigned, respectively, to the suppression of the printing of two classes of sub-totals A and B by the type bars allotted for this purpose. By activating pins 185 resting upon bars 186 at the intersection of said bars 179 and 184 with the cross bars 146 individual to said type bars, the operation of either of said bars 179 or 184 at the beginning of a total-taking cycle and before the type bars start upwardly, will result in the operation of those bars 146 located above the activated pins 185 and the consequent release of the associated pawls 148 which then engage the uppermost teeth 150 of their respective type bars to suppress the same to thereby prevent printing of a total, and also avoid clearing of the associated accumulators.

Groups of type bars which are employed to print code designations, also known as group indications, may be suppressed in the same manner as above by activated pins 185 at the intersection of the bars 180 and 183 with bars 146 individual to said type bars. The bar 180 controls a group of type bars assigned to the printing of code designations related to a group or groups of accumulators allotted for the taking of A totals, while the bar 183 controls those type bars that print code designations associated with a group or groups of accumulators assigned to the taking of B totals. The mentioned suppression operation is accomplished after the first listing cycle of the machine during which a code designation is printed, and such suppression continues until a change of designation and consequent total-taking cycle occurs. Then, during the following listing cycle, a code designation of different value will be printed and the above sequence repeated.

Bar 181 is utilized to effect the printing of sub and grand total designations T and G, respectively, in conjunction with the active group or groups of accumulators, by the activation of a pin 185 for each accumulator group at the intersection of said bar 181 with the bar 146 individual to the type bar assigned to said accumulator group for the printing of said designations. The control of said bar 181 is such that it is operated in timed relation to the upward movement of said type bar so that said bar 146 will be actuated to release its pawl to engage the type bar tooth 150 assigned to the particular total designation to be printed.

Type bar elimination in the upper transfer unit is accomplished during both listing and total-taking cycles by rendering active those pins 185 at the intersection of the bar 182 with the bars 146 associated with the type bars that are to be eliminated. Again, as with the bars 179, 184, the bar 182 is operated before the type bars start their upward movement so that the pawls 148 individual to the type bars to be eliminated will be released by the bars 146 to engage the uppermost of the teeth 150 in each of the type bars.

Other control functions besides those enumerated above may be accomplished by the addition of more bars similar to the bars 179 to 184.

*Auxiliary controls by lower transfer unit*

In connection with the lower transfer unit 133, as illustrated in Fig. 29, it is apparent from the foregoing description that when an X hole appears in any column of the card, it will cause the actuation of the bar 137 in said unit which is individual to said column, this being accomplished through the operation of the control pin 112 individual to said column and bar, which pin operates the associated lever 145. At the intersection of said bar 137 with the crossed control bars 156 assigned to the type bars which are to be suppressed by the appearance of said X hole, transfer pins 135 are rendered operative by the set-up plate 187 (Fig. 8), presently to be described in more detail in connection with the accumulator control operation, so that when said bar 137 is actuated it will elevate all said operative pins thereabove and thus cause the control bars 156 thereabove to be operated to release their respective pawls 157 to engage the teeth 158 and thus prevent said type bars from moving upwardly.

In addition to the group of bars 156 which are each individual to one of the type bars, there are provided other groups of accumulator control bars 188 and 189 (Figs. 21, 22 and 29) similar to the bars 156, and all under the control of X holes in the card columns, said bars 188 and 189 being linked to bars 190. Only two such bars 188 and 189 are shown in Fig. 21 at opposite ends of the large group containing the bars 156 but, actually, there are two groups each containing three of said bars 188, 189. One of these groups 189 is fragmentarily shown in Fig. 22 as disposed above the end of the transfer unit 133 and, as illustrated in Fig. 29, is arranged nearest the analyzing section of the machine while the group 188 is similarly arranged on the opposite side of the large group 156. Said six bars 188, 189 are utilized to differentially control groups of the paired upper and lower sub-total and grand total accumulators 191 and 192, respectively, by causing their adjustment to adding, subtracting or neutral positions. The adding position (Fig. 8) of the accumulators in any one group prevails as long as no X hole appears in a card. To attain the subtracting position of the accumulators in said group or any other group, an X hole can be punched in any one of the columns of the card and said hole will automatically cause the shifting of the accumulators to said position, while an X hole appearing in a different column will automatically produce an adjustment of said accumulators to neutral position. The subtracting and neutral automatic controls are effected by the bars 188, 189 by rendering active, through the set-up plate 187, certain transfer pins at the intersection of said bars 188, 189 with the bars 137 individual to the card columns in which said X holes are located and, in such instance, no operative pins will appear at the intersection of said bars 137 with the bars 156 unless it is desired to suppress the type bars associated with a group of accumulators that is being adjusted to neutral position. In the latter case, active pins at the intersection of bars 156 with the same bar 137 controlled by an X hole and used to effect the neutral adjustment, will produce suppression of the desired type bars, as previously described.

The automatic differential control of a group of accumulators is accomplished, in conjunction with said bars 188, 189, through the medium of two sets of pivoted bails diagrammatically shown in Fig. 29 at 193, 194, 195 and 196, 197, 198. Said bails are structurally illustrated in Figs. 21 and 22 as extending across the accumulator section of the machine directly above the front portion of the lower transfer unit 133 and each pair of bails 193—198, 194—197 and 195, 196 is assigned to one group of accumulators. Positioned above the bails 193, 194 and 195 at one end of the transfer unit 133 is a set of three locking interposers 199, 200, 201 (Figs. 21 and 29) each individual to one of the latter bails and provided with a lug 202, represented in Fig. 29 by a dot, which normally rests upon its bail to prevent upward swinging movement thereof. Said interposers are actuated, or not, depending upon the operation or non-operation of their associated bars 188 and the condition of these bars is, in turn, dependent on the active or inoperative positions of transfer pins 203 which, like the pins 135, are under the control of the set-up plate 187 and are the pins previously mentioned which are located at the intersection of the bars 188 with the bars 137. Similarly, above the other end of the transfer unit 133, there are three locking interposers 204, 205 and 206 provided with lugs 207 individual, respectively, to the bails 196, 197 and 198 and actuated, in the same manner as the first named interposers, by the bars 189 under the control of active transfer pins 208 which are the other previously mentioned pins at the intersection of said bars 189 with the bars 137. The pair of interposers 201, 206 automatically controls the pair of bails 193, 198; the intermediate pair of interposers 200, 205 likewise controls the bails 194, 197; and the interposers 199, 204 similarly control the bails 195, 196. These controls determine, by the relative positions of the interposers of each pair, whether the group of accumulators assigned to each pair of bails is to perform an adding or subtracting operation or is to be adjusted to neutral position.

In addition to the six columns of transfer pins 203, 208 which automatically and variably control the positions of the two sets of interposers, the unit 133 has the six rows of transfer pins 209 (Figs. 8 and 22) arranged in two groups extending longitudinally of the bails 193 to 198, with each row being associated with one of said bails and having therein a pin for each set of accumulators 191, 192, and said pins 209 are also rendered operative or remain in their normally inoperative positions under the control of the set-up plate 187. The six rows of pins 209 thus provide a column of six pins for each set of accumulators, and wherever the sets of accumulators of any group thereof are to be differentially controlled, two pins in each column assigned to each set of such accumulators in said group are rendered operative by the plate 187, while the remaining pins in said column are left inactive with their lower sections in angular position, as clearly shown in Fig. 22. Thus, with the bails 193, 198 assigned to one group of accumulators for the automatic and differential control thereof, the two pins 209 in each column associated with the sets of accumulators in said group and located below said bails, will be made operative by the plate 187.

It will be understood that, instead of the two active pins in Fig. 22, either of the pairs of inactive pins therein shown as associated, respectively, with the pairs of bails 194, 197 or 195, 198 may be selected to control the adjustment of the accumulators shown in said figure to the desired position, and that all other accumulators of the group in which the first named accumulators appear will be controlled in the same manner by similar pairs of active pins under the same pair of bails, with other separate groups of accumulators which are to be adjusted to other positions each being controlled by different pairs of pins. Thus, although two pairs of pins 209 in each of several columns and assigned to one group of accumulators may be inactive for any particular analysis operation, should it be desired to alter the grouping arrangement for a different analysis, or differently split the accumulators as it is sometimes described, it may be found expedient to assign one or the other of the inactive pairs of pins shown in Fig. 22 to the control of the set of accumulators therein illustrated. In this manner, a maximum flexibility in the choice of grouping the accumulators and of their adjustment to adding, subtracting or neutral positions may be obtained.

Figure 8:
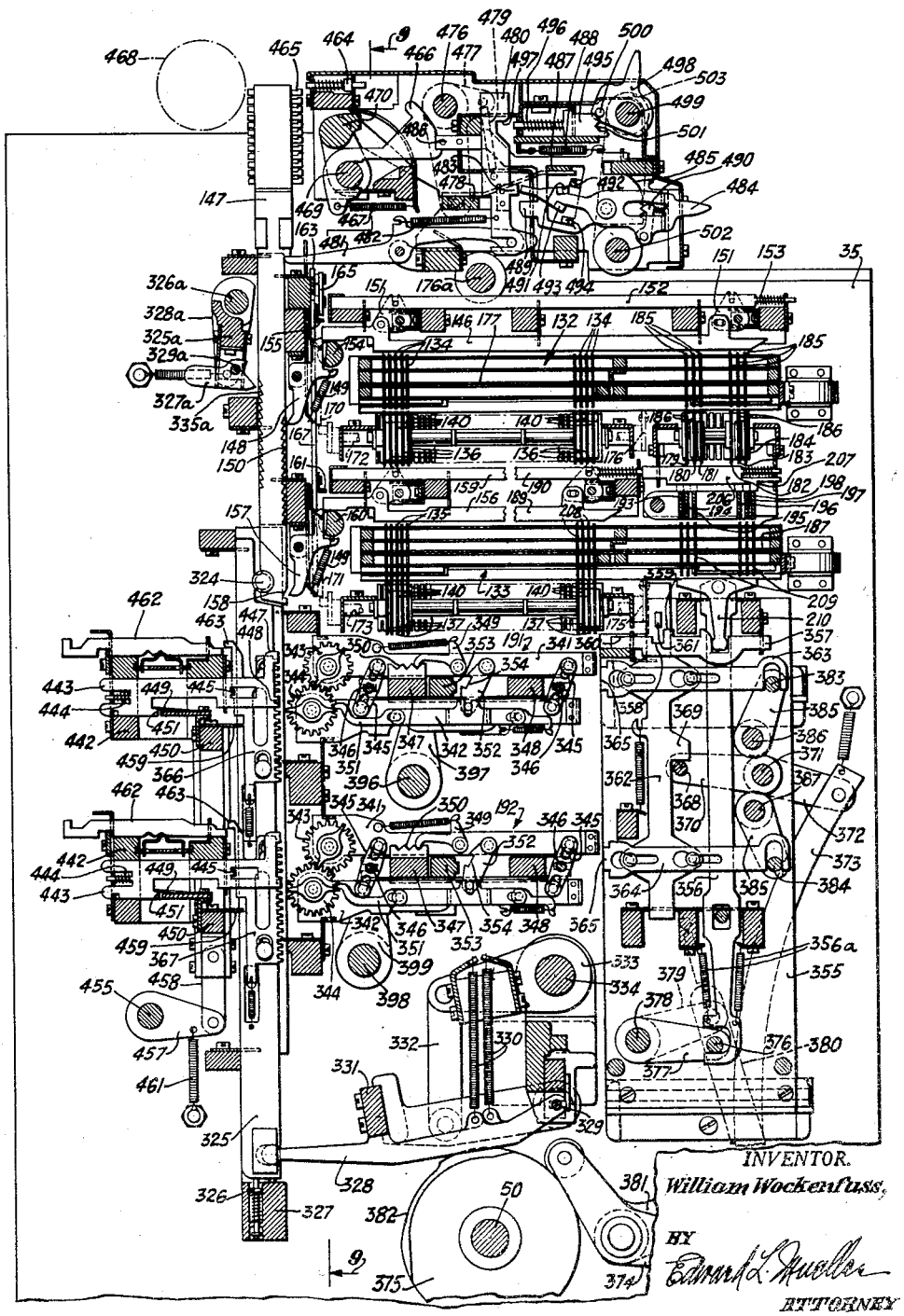
Fig. 8 is a transverse section through the printing section on the line 8—8 of Fig. 5.
Figure 9:
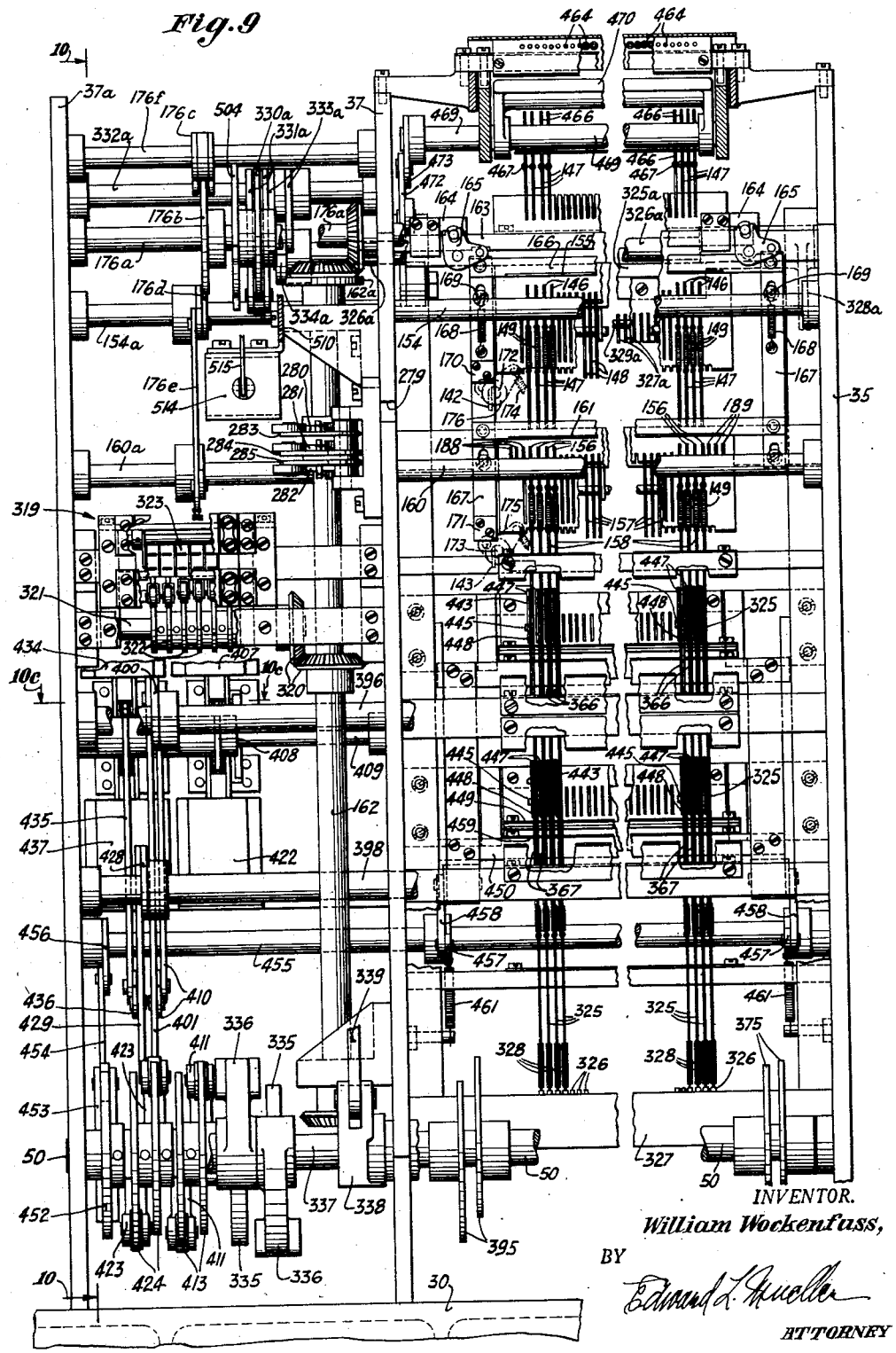
Fig. 9 is a section on the line 9—9 of Fig. 8.

As fragmentarily shown in Fig. 22b, the lower transfer unit 133, which contains the set-up plate 187, comprises upper and lower frames illustrated in Fig. 8, and said frames include, respectively, the superposed supporting plates 187a and 187b. The portions of said frames and of the plate 187 shown in Fig. 22b are those which form part of the auxiliary control section of Fig. 29 in which the plates 187a are provided with six longitudinal rows of openings 187c arranged in two equal groups with each transverse column of six openings, together with the upper sections of the transfer pins 209 mounted and guided therein, being individual to one of the accumulators. Said upper pin sections normally rest upon the lower of the two plates 187a with the upper end of each pin section in contact with one of the bails 103—198. The set-up plate 187 rests upon the upper plate 187b which has rows of elongated openings 187d therein that partially align with the short openings 187c in the plates 187a and the openings 187e in the lowermost plate 187b. The latter openings receive the lower ends of the lower sections of the transfer pins 209 which have lugs 187f that normally rest upon the lower plate 187b to support the lower pin sections in tilted position relative to the upper sections of said pins, and this normal position is permitted by reason of the elongation of the openings 187d in the upper plate 187b. The set-up plate 187 is provided with selectively arranged short and long openings 187h and 187i which receive the upper ends of the lower sections of the pins 209 when the plate 187 is preliminarily placed in position on the upper plate 187b. Then, by moving the plate 187 to the right, as viewed in Fig. 22b, to the position shown therein, those lower sections of the pins which extend through the short openings in said plate 187 will be shifted from their tilted positions into alignment with their respective upper sections, as indicated by the two extreme pins in said figure and also in Fig. 22; while those lower pin sections which project through the elongated openings 187i will be undisturbed by said movement of the plate 187 and will therefore remain in their normal tilted positions where they will have no effect when the pins are sensed in a manner to presently appear. This same construction exists throughout the remainder of the unit 133 so that all the other transfer pins therein will be controlled in a like manner by the plate 187.

As long as no X hole appears in a card to operate either of the locking interposers 201 and 206 individual to the respective bails 193, 198, said interposers will engage their bails by means of the lugs 202 and 207, respectively, to prevent upward swinging movement of either bail under the influence of a vertically movable feeler and accumulator control member 210 associated with each set of upper and lower accumulators. Each member 210 is rockingly supported so as to assume three positions for differentially controlling its set of accumulators. When in its vertical position, said member will adjust the accumulators to their adding position; when rocked clockwise, as viewed in Fig. 22, it will adjust the accumulators to subtracting position; and when tilted in the opposite direction, it will cause said accumulators to assume their neutral position. Therefore, with the above mentioned condition existing in which no X hole appears and wherein neither interposer 201 or 206 is operated to unlocking position by its associated bar 188 or 189, when the feeler 210 rises during each machine cycle to contact the two active pins 209, the latter will combine with the locked bails 193, 198, to form a rigid abutment and said member 210 thereby will be caused to assume its vertical or adding position. If, however, the interposer 201 (Fig. 21) is operated by an active pin 203 beneath the bar 188 associated with said interposer, the latter will be moved forwardly to its unlocking position with respect to the bail 193 to release the latter for upward movement (Fig. 22) and, with the interposer 206 over the bail 198 remaining in its locking position because of the absence of an active pin 208 under the bar 189 which controls said interposer 206, it will be apparent that as the feeler 210 contacts the two active pins 209 assigned to each set of accumulators in the group under discussion, the pin under the bail 193 will be raised to swing said bail upwardly, while the other pin 209 will be held stationary by the locked bail 198. Consequently, the feeler 210 will be turned clockwise to shift the associated set of accumulators to subtracting position. As will now be obvious, the third or neutral position of each set of accumulators is attained by reversing the above described positioning of the two interposers 201 and 206 to retain the bail 193 locked and to release the bail 198 for upward movement.

In like manner, the sets of accumulators included in the other two groups may be automatically and differentially controlled by rendering active two pins 209 in each of the columns assigned to said accumulators, with said pins for one group of accumulators positioned under the pair of bails 194, 197, and those for the other group located beneath the pair of bails 195, 196, and with said pairs of bails being controlled, respectively, by the pairs of interposers 200, 205 and 199, 204.

It will be noted that the bails 194 and 195, at their left ends (Fig. 21) are provided with longitudinally offset notches 202a, and that the bails 197 and 198, at their right ends, have similar notches 207a. When the interposer 201 is advanced to unlocking position with respect to the bail 193 during the control of one group of accumulators, as hereinbefore described, the lug 202 on said interposer will be vertically aligned with the notch 202a in the bail 194. This alignment frees the bail 194 for upward movement in the control of a second group of accumulators simultaneously with the first named group in the event that the interposer 200 is advanced to disengage its lug 202 from said bail 194. In the latter event, the lug 202 on the interposer 200 will be vertically aligned with the notch 202a in the bail 195 so that the latter will also be free for upward movement should the interposer 199 be advanced to disengage its lug 202 from said bail 195 in the control of a third group of accumulators simultaneously with either or both of the first two mentioned groups. Similarly, at the right end of the bails, advancement of the interposer 204 will vertically align its lug 207 with the notch 207a in the bail 197 to free the latter for upward movement should its controlling interposer 205 be advanced, and advancement of the latter interposer will align its lug 207 with the notch 207a in the bail 198 in order to permit upward movement of the latter bail should its interposer 206 be advanced.

In the foregoing description relating to the control of the accumulators by the lower transfer unit 133, all of said controls have been differentially or variably effected automatically by the operation or non-operation of the sets of interposers influenced by the appearance or absence of an X hole in a card.

As distinguished from said differential or variable operation, a preset or constant control of said accumulators may be accomplished independently of X holes and the interposers, and through the sole medium of the set-up plate 187 and the pins 209 controlled thereby. Thus, if it is desired to have one group of accumulators set for adding during each cycle of the machine, it is only necessary to activate, by the set-up plate 187, the two pins shown in Fig. 22 of each set of accumulators in said group. Then, each time the feeler member 210 engages said pins it will be apparent, bearing in mind that the bails 193, 198 are now always locked by their interposers, that said feeler will be made to assume its vertical or adding position. For the constant neutral position of another group of accumulators, it is only necessary to activate one pin 209 in the column of each set of accumulators controlled by the bail 194 or 195, and with all other pins inoperative in the different columns assigned to said group of accumulators, each feeler 210 will be tilted counterclockwise by the active pin to position its associated set of accumulators in neutral. In the same manner and with respect to another group of accumulators, they may be caused to assume the subtracting position of Fig. 22 by activating one pin 209, for each set of accumulators in said group, under the bail 196 or 197.

It will be further apparent from the foregoing that one or two groups of accumulators may be differentially controlled by X holes and the interposers, while the remaining group, or groups, may be preset under the sole control of pins 209.

Other operations capable of accomplishment through the lower transfer unit are those wherein, during different cycles of adding operations by a group of accumulators and listing by associated type bars, it is desired, in one of said cycles, to suppress said type bars and, consequently, prevent them from listing and their accumulators from accumulating; and then, in another cycle to eliminate adding by said accumulators but continue to allow the type bars to list. For the first of these operations, pins 135 along a bar 137 individual to any one of the columns of a card in which an X hole appears, are activated at the points of intersection of said bar with the bars 156 associated with the group of type bars in question, but no pins 203 and 208 are activated between said bar 137 and the bars 188, 189. With this condition existing, said bar 137 is operated by the sensing of said X hole to control, through said pins 135, the release of all pawls 157 of the type bars to suppress the same and thus prevent them from listing. To accomplish the second of said operations in which only the accumulators are to be suppressed while continuing to permit the type bars to list, another card having an X hole in a different column from the first named card will cause the operation of a different bar 137 over which is an activated pin 208 only at the intersection of said bar with the bar 189 individual to the group of accumulators being controlled. The consequent operation of said bar 189 by the sensing of said X hole will activate the interposer 204, 205 or 206 individual to the correlated bail 196, 197 or 198 associated with said group of accumulators so that the latter will be adjusted to neutral position by the feelers 210, thus permitting the type bars to move upwardly and list, and then restore without rolling into the accumulators the items listed.

*Operation of auxiliary control section of upper transfer unit*

Referring particularly to Figs. 10 to 12 and 23, this operation of the bars 179 to 184, the left ends of which extend through a slot 279 in the wall 37, has its origin on the vertical cam shaft 162 on which are mounted three cams 280, 281 and 282 for rocking the follower levers 283, 284 and 285, respectively, during each cycle of operation. As will presently appear in detail, the cam 280 and its lever 283 control the previously described suppression of printing of A and B totals through the bars 179 and 184, the A and B group indications through the bars 180 and 183, and the type bar elimination through the bar 182, and the angularly displaced cams 281 and 282 and their levers 284 and 285 control at different intervals, respectively, the printing of G and T designations through the bar 181.

Figure 11:
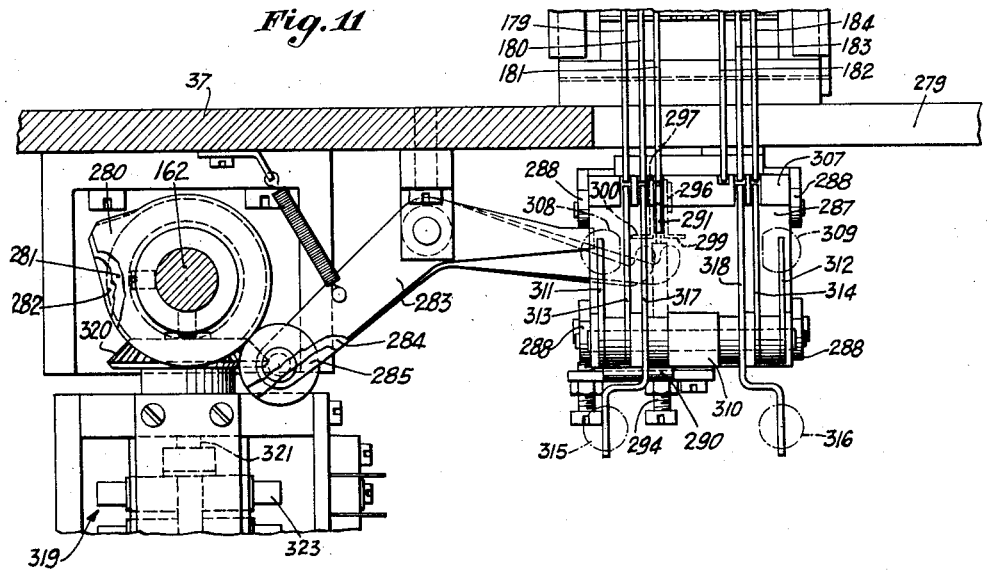
Fig. 11 is an enlarged section on the line 11—11 of Fig. 10, illustrating the control mechanism for the auxiliary section of the upper transfer unit.
Figure 12:
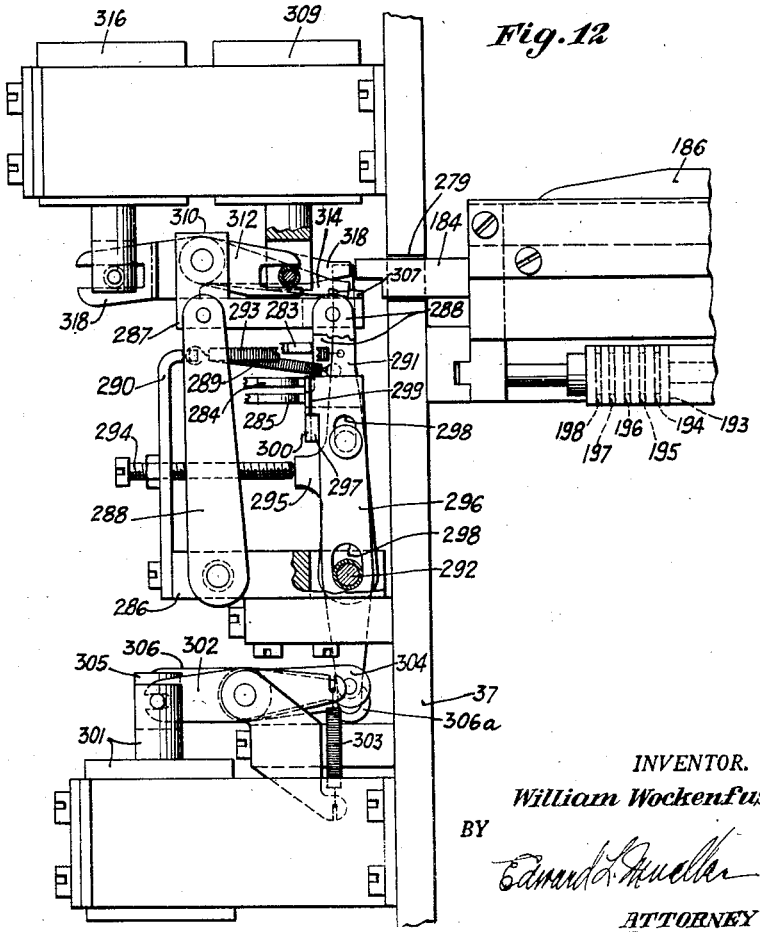
Fig. 12 is an elevation, partly in section, of the mechanism shown in Fig. 11, with parts in their operated positions.

The operating mechanism responsive to the various mentioned cams for actuating the bars 179 to 184 comprises a framework consisting of a stationary base plate 286 attached to the wall 37 and an upper supporter plate 287 connected, by four links 288, to the plate 286 for slight reciprocatory movement toward and away from said bars. This motion occurs during every cycle of the machine while the cam shaft 162 is being driven and is accomplished by engagement of one end of the lever 283 with one of the links 288, as best shown in Figs. 11 and 12. A spring 289 connects a bracket 290 secured to the plate 286 with one of the links 288 to effect the return motion of the framework after it has been momentarily advanced by the cam 280 toward said bars 179 to 184.

An operating arm 291 for the bar 181, which is the bar that controls the printing of the T and G designations, has its lower end pivoted at 292 to the base plate 286 and its upper end disposed in alignment with said bar 181 so as to actuate the latter when said arm is advanced, either under the influence of the cam 281 and its lever 284 when a G designation is to be printed, or by the cam 282 and its lever 285 when a T designation is to be printed by the type bar or bars controlled by the bar 181 in the manner previously explained. A spring 293 connecting the bracket 290 with the arm 291 restores the latter after it has been advanced, and this restoring movement is limited by a set screw 294 threaded in the bracket 290 and engaging the projection 295 on said arm 291.

The dual control of the bar 181 for T and G printing during total-taking cycles is effected by two independently and vertically movable interposers 296 and 297 arranged on opposite sides of the arm 291 and having slotted connections 298 therewith so as to guide the interposers in their vertical movements. The upper end of the interposer 296 has a lateral extension 299 normally disposed slightly above and projecting in an opposite direction from a similar extension 300 on the interposer 297. In the lower normal position of the interposer 296 (Fig. 5), its extension 299 is not in the path of movement of the adjacent end of the lever 284 which will then pass over said extension upon advancement of the framework, but when said interposer is raised, as shown in Fig. 12, the lever 284, when operated, will contact the extension and, through the connection of the interposer with the arm 291, the latter will be advanced with said framework and thus operate the bar 181 to cause the arresting of a type bar at the proper position for printing a G designation. Similarly, but at a different time in the machine cycle, when the interposer 297 is raised, its extension 300 will be projected into the path of the adjacent extremity of the lever 285, resulting in the same operation of the arm 291 and bar 181 to cause the printing of a T designation. The high points of the two cams 281 and 282 which control the operations of the bar 291 are angularly displaced so that said arm is operated at different instants in the cycle to thus arrest the type bar in different positions for the printing of the T and G designations.

For raising the interposer 296 to operative position at the beginning of the grand total-taking cycle which is initiated by depressing the grand total key 236, there is provided a G-print solenoid 301 (Figs. 10 and 12) whose core is connected to one end of a lever 302, to the other end of which is attached a restoring spring 303. An arm 304 mounted on the pivot of said lever and movable therewith, is connected to the lower end of the interposer 296 so as to raise the latter upon energization of said solenoid. A T-print solenoid 305 automatically energized at the beginning of a total-taking cycle, is similarly connected, through the lever 306 and arm 306a, to the lower end of the interposer 297 to raise the same, and said interposers 296, 297 are lowered, upon de-energization of their respective solenoids by the springs 303 connected to the levers 302 and 306.

The bar 182 utilized for type bar elimination is operated upon each advance of the framework under the control of the lever 283, and this is accomplished through direct contact of a cross piece 307, mounted on the movable plate 287 of the framework, with the adjacent end of said bar (see Fig. 11).

Control of the A and B total print-suppression operations through the respective bars 179 and 184 is attained, respectively, by the print suppress solenoids 308 and 309 which are supported above the operating mechanism for said bars and are energized at the beginning of a total-taking cycle. A bearing 310 on the movable plate 287 pivotally supports bifurcated arms 311 and 312 coupled, respectively, to the cores of solenoids 308 and 309. Interposers 313 and 314, also pivotally supported by the bearing 310, are joined thereon to their respective arms 311 and 312, and the free forward ends of said interposers are so disposed with respect to their bars 179 and 184 that when the solenoids are not energized and the framework is advanced by the arm 283, the interposers will pass beneath the reduced end of said bars and not operate the same. However, when said solenoids are energized, the interposers will be raised and thus align themselves with the extremities of their respective bars 179, 184 so that upon advancement of the framework, said bars will also be advanced to operate the activated pins 185 at the intersection of said bars with the cross bars 146 assigned to those type bars which are to be suppressed by the pawls 148 to prevent printing of totals by said type bars.

Solenoids 315 and 316, arranged on the opposite side of the bearings 310 from the solenoids 308, 309 are energized in the initial stage of the cycle following a total-taking operation and are utilized to control the operation of bars 180 and 183, respectively, assigned to A and B group indications, whereby type bars employed for printing code designations may be suppressed at all times except during the first printing of a code designation which occurs after each total-taking operation has been completed. The core of solenoid 315 is directly connected to the rear end of an interposer 317 associated with the bar 180 and pivoted in bearing 310, and the solenoid 316 is similarly connected to the pivoted interposer 318 which controls the bar 183. Said interposers have their forward ends normally aligned with the adjacent extremities of their respective bars 180, 183 and will thus operate the latter upon each advancement of the framework as long as the solenoids 315 and 316 are not energized. Upon energization of said solenoids, which occurs after each total-taking cycle as previously mentioned, the forward ends of the interposers 317 and 318 are lowered so that when the framework is advanced, said ends will pass beneath the extremities of the bars 180, 183 and thus fail to operate the same, with the result that the activated pins 185 between said bars and the cross bars 146 assigned to the group indication type bars will not be operated to suppress the latter bars which will then rise to print the proper code designation.

The energization of the various solenoids 301, 305, 308, 309, 315 and 316 is more fully explained in connection with the circuit diagrams of Figs. 26 and 27.

The timing shaft 162, in addition to controlling the operations just described, also operates the print-control switching unit generally indicated at 319 (Fig. 10), through gearing 320 which drives the cam shaft 321 of said unit. On said shaft 321 are a plurality of cams generally indicated at 322 and designed to operate micro-switches generally indicated at 323 for controlling, at predetermined intervals, the closing and opening of various circuit connections (Figs. 26 and 27) associated with certain printing operations of the machine.

*Type bar operation*

The upper sections of the type bars 147 are removably joined, at 324, to the lower sections 325 thereof which, in their lowered positions, rest upon and depress the spring urged plungers 326 mounted in a stationary member 327 so that said plungers will impart an initial impetus to the type bars at the beginning of their upward movement toward printing positions. The lower end of the section 325 of each type bar is engaged by one end of an operating arm 328, the other end of which is pivoted at 329. The type bars are urged upwardly by the springs 330 and are controlled in such upward movement by the common bail 331 which oscillates about the same axis as the arms 328 and engages them to control their upward movement under the influence of said springs until the type bars are arrested, whereupon the bail moves upwardly independently of the arms. Said bail is operated in synchronism with the action of the previously described scanning device 211 (Fig. 4) so that the type bars will be arrested in proper positions by the action of the upper transfer unit 132 which is under the control of the analyzer and which, in turn, controls the arresting pawls 148. The subsequent downward movement of the bail 331, following the printing operation later to be described, engages the same with the arms 328 of all operated type bars to restore the latter to their lower positions at the conclusion of a machine cycle.

Figure 13:
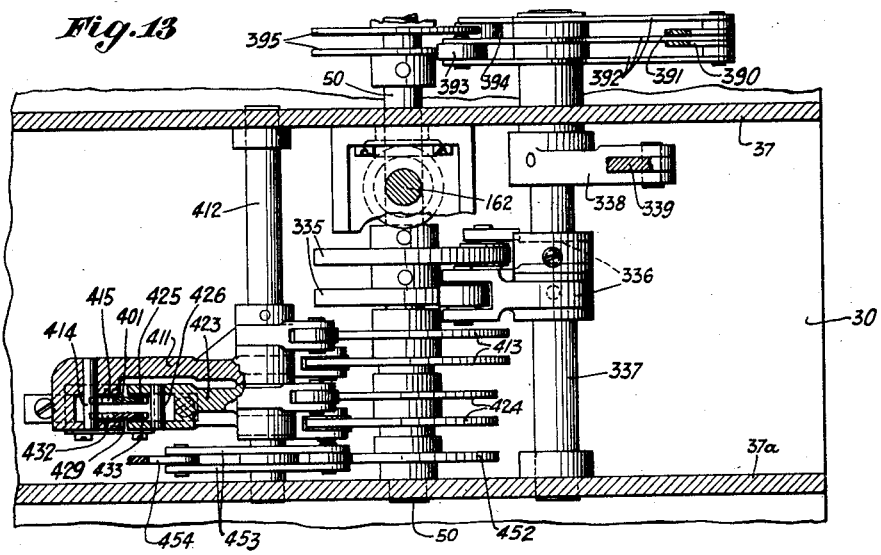
Fig. 13 is a horizontal section on the line 13—13 of Fig. 10.

To oscillate the bail 331, the ends of its supporting frame are connected by links 332 to crank arms 333 secured on the rock shaft 334. Said shaft is operated from the main cam shaft 50 (Figs. 5, 10 and 13) by the complementary cams 335 thereon, which are engaged by the two rollers of a follower 336 secured on the rocking stub shaft 337. An arm 338 on the latter shaft is connected, by a link 339, to a similar arm 340 on one end of the shaft 334 so that oscillatory motion is transmitted thereto from said cams 335 to raise and lower the bail 331.

Figure 14:
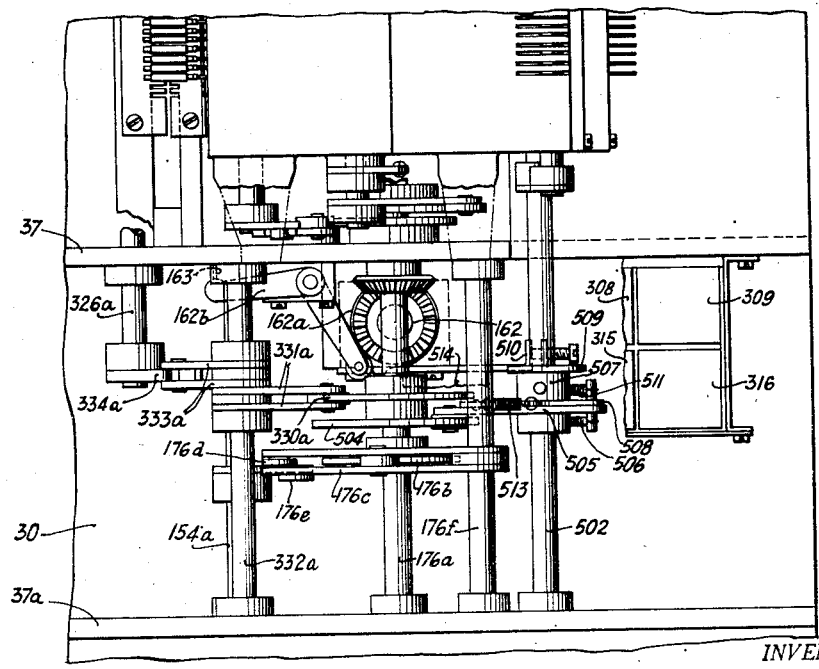
Fig. 14 is a plan view of the left portion of Fig. 9.

After the type bars have been arrested in their raised position but before the printing operation is performed, it is desirable to accurately align the type with elements of the printing mechanism. For this purpose there is provided an aligning bail 325a (Fig. 8) mounted on a rock shaft 326a and supporting a pivoted pawl 327a for each type bar by means of the crank arm 328a and the rod 329a which forms the pivot for said pawls. A cam 330a (Figs. 9, 10 and 14) on the shaft 176a controls the bail 325a and, for this purpose, is connected by follower 331a secured on the rock shaft 332a. One end of the latter shaft carries an arm 333a engageable in the bifurcated end of an arm 334a on the adjacent end of the shaft 326a so as to rock the same to move the bail toward and away from the type bars. In operation, the bail is moved inwardly by said cam as soon as all type bars have reached their printing position and, in so doing, the pawls 327a are engaged with the slopes of the teeth 335a of said bars and, due to the slight inclination of the pawls, will thereby engage the teeth and lower said bars slightly to thus position their type properly for the printing operation that immediately follows. At the conclusion of said operation, the type bar restoring bail 331 starts its downward movement and, at substantially the same time, the bails 154 and 160 (Fig. 21) disengage the arresting pawls 148 and 157 from said bars. Therefore, in order to prevent said bars from movement upwardly under the influence of their springs 330 before the bail 331 engages the bars to move them downwardly, the pawls 327a remain in their operative position in engagement with the teeth 335a until the type bars have been fully restored, whereupon the said cam 330a acts to rock the bail 325a and its pawls to normal or inoperative position.

*Designation change sensing mechanism*

Figure 3:
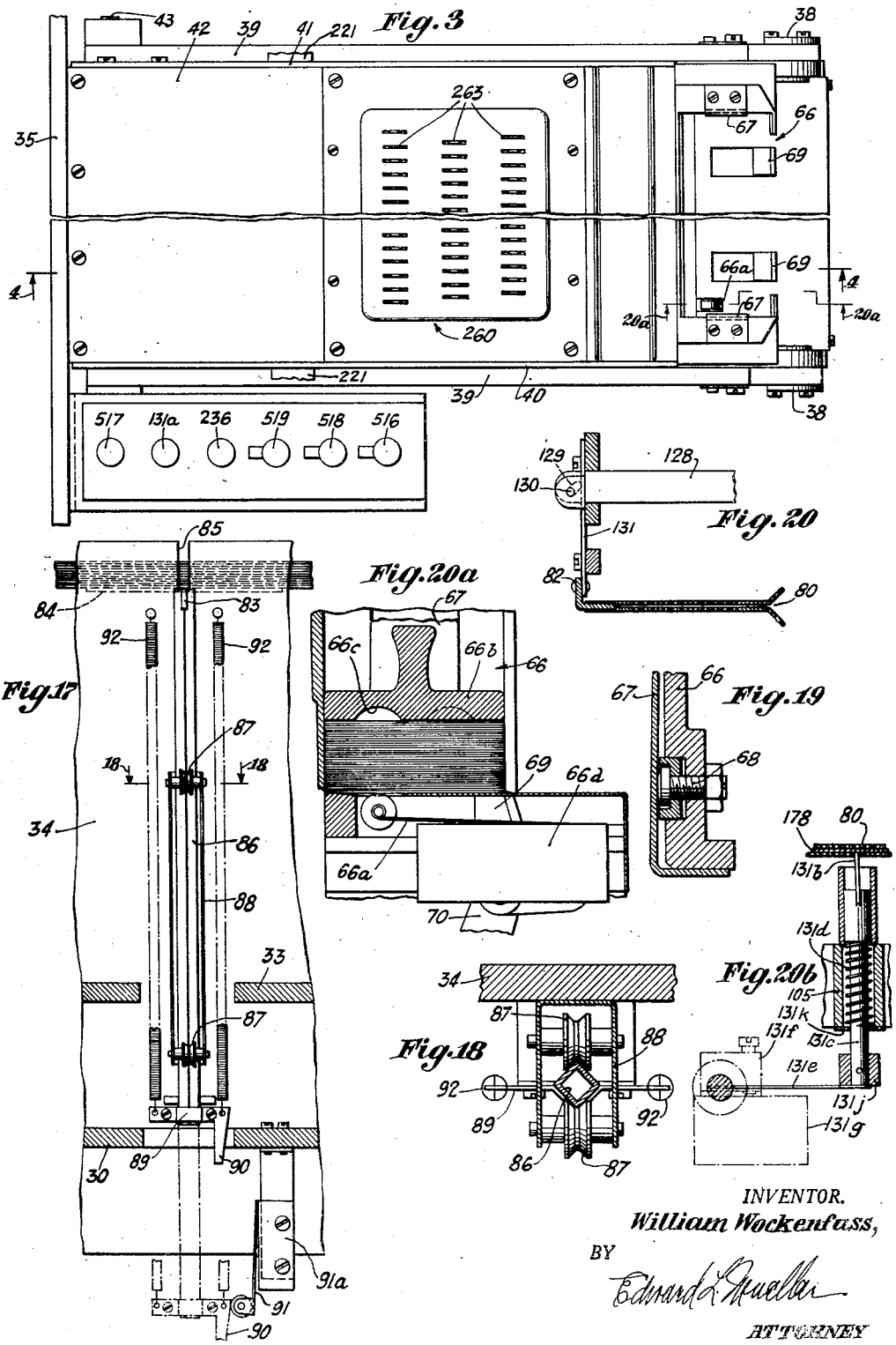
Fig. 3 is a fragmentary top plan view of said section.

This mechanism, as generally understood in the art, has for its purpose the initiation of a total-taking cycle upon the sensing of a change of group designation in the cards being analyzed. In the present machine, this is accomplished by the mechanical comparison of cards at the sensing and analyzing stations 79 and 81, and when said cards do not compare, indicating a change of designation, the operation of the analyzing section of the machine, including the card feed, is stopped for one cycle, totals are taken during said cycle and, at the conclusion thereof, the card feed and analyzing operations are automatically resumed. Provision is made for the automatic taking of the two classes of sub-totals, hereinbefore referred to as A and B, from different fields of a card; while the initiation of the taking of a grand total, designated as G, is accomplished by a manual operation such as the pressing of a key 236 (Figs. 1 and 3) to re-start the machine after it has been automatically stopped at the conclusion of a card run. The taking of sub-totals A and B, in response to a change of designation, is initiated from the micro-switches (Figs. 2 and 6) generally indicated by the numerals 237 and 238, respectively, and the automatic control of these switches will now be described.

As briefly mentioned hereinbefore, any elevated and locked pin 110 in each row of pins will be projected into the path of the pawl 222 individual to said row, causing said pawl to be elevated, as described in connection with the pawls 223, as the scanning frame 211 progresses through its primary movement. Associated with each pawl 222 and supported thereabove by said scanning frame is a slide 239 identical to the slides 225 and controlled in the same manner so as to be moved with said frame when its raised pawl 222 engages a tooth 240 corresponding to the pin 110 which has been elevated. Movement of said slide 239 with the frame 211 disengages one end of a lever 241 from a recess 242 in the upper edge of the slide and thus causes a slight upward swinging movement of said lever, the purpose of which will later appear. With this arrangement, it becomes apparent that if corresponding teeth 224 and 240 in the respective slides 225 and 239 are engaged by the associated operating pawls 223 and 222, indicating a similarity in the group designation of the cards then at the two stations 79, 81, both said slides will be moved simultaneously by their pawls to likewise rock the levers 226 and 241, with the result that the group control mechanism, presently to be described, will not become effective to stop the card feed and initiate a totalizing operation at the conclusion of the analyzing cycle and with the further result that the lever 226 will perform its previously described function.

However, if two cards at the sensing and analyzing stations do not compare, then one or the other slide 225 or 239, depending upon the relative positions of the non-corresponding pins 111, 110, will be first engaged and moved by its pawl, followed by the secondary engagement and movement of the other slide. This differential in movement of the two slides results in the operation of one or the other of the switches 237 or 238 depending upon a prearranged set-up made in the group control mechanism in which set-up one field of each card, together with the associated pairs of slides 225, 239, is assigned for taking an A total and a different field is allotted to the B total.

Each pair of levers 226, 241, when rocked either simultaneously or successively, operates a pair of bell cranks 243 and 244, respectively, and the latter elements carry spring-urged pawls 245 and 246 with which is associated an analyzer controlled slide 247 that responds to the operation of said pawls with primary and secondary movements in the same direction, only the secondary movement occurring when there is a change of designation. At each end of said slide the same is provided in its lower edge with a pair of teeth 248, 249, the former of which are engaged by the pawls 245, 246 during the normal condition of the control mechanism, and also during the primary movement of the slide 247 if both said pawls are operated simultaneously. The upper edge of each slide is provided with elongated slots 250 and 251 with which are associated, respectively, the actuating members 252, 253 in the form of a pair of spring-urged levers that normally assume the position shown in Fig. 4 in which their outer extremities are out of the slots 250, 251. Said levers are pivotally supported in rocking bails 254 and 255 that are keyed to the shafts 256 and 257 journaled in the side plates 40, 41 (see also Fig. 2) and which carry the trip plates 258 and 259 of the respective switches 237, 238 so as to close the latter when said shafts are turned by a rocking movement of the bails 254, 255.

To establish a predetermined set-up in the control mechanism with respect to two or more different fields of the cards which are allotted for A and B totals, there is provided a selector device generally indicated at 260 and mounted directly beneath the top plate 42 and partially encased by an auxiliary plate 261. Said device comprises a plurality of slides 262 arranged side by side across the machine and each being individual to one of the card columns. Each slide has a key 263 which extends upwardly through a slot in the plate 42 whereby the key may be adjusted from the neutral position of Fig. 4 to the left or right depending upon whether the card column to which the slide is individual is in a field from which A or B totals, respectively, are to be taken. A spring 264 urges the slide 262 downwardly against the plate 261 which is slotted to receive a guide lug 265 and a projection 266 both on the lower edge of the slide. The projection 266 engages in a recess in the rocker member 267 individual to said slide and mounted, with other similar members, for rocking movement on the common shaft 268. The two lower extremities of the rocker member 267 engage the inner adjacent ends of the associated levers 252 and 253, and control the positions of said levers with respect to the slots 250 and 251 in the slide 247.

In adjusting the selector device preliminary to a machine operation, if a slide 247 assigned to any column of a card is not to be involved in the taking of an A or B total, its associated slide 262 remains in, or is adjusted to, the neutral position so that the rocker member 267 and the levers 252, 253 will assume the position of Fig. 4 wherein said levers will be unaffected by either the primary or secondary movements of the slide 247, which movements are under the influence of the slides 225, 239.

To assign said slide 247 for the taking of an A total, the corresponding key 263 is shifted to the left position, thereby rocking the member 267 counterclockwise to depress the inner end of the lever 252 and release the corresponding end of the lever 253 whose outer end then enters the right hand extremity of the slot 251 in the slide 247. From this, it will be apparent that an adjustment to the right hand position of the key 263 associated with another slide 247 assigned to B total-taking, will effect a reversal of the operation just described so that the outer end of the lever 252 will be positioned in the right hand extremity of the slot 250 of said slide.

Assuming now that two cards at the stations 79, 81, have the same group designations, the pawls 222, 223 will be raised simultaneously by the elevated pins 110, 111 to engage corresponding teeth in the two slides 225, 239, with the result that said slides will be moved from their normal positions at the same time and thus simultaneously rock the bell cranks 243, 244. This action causes the pawls 245, 246 to impart only the primary movement to the slide 247 against the tension of its return spring 269. With the outer end of one or the other levers 252, 253 in the right hand extremity of its associated slot 250 or 251, the latter are of such length that, at the conclusion of said primary movement, the left hand extremities of said slots will only reach, but will not move, the levers 252 or 253 and, therefore, neither of the bails 254, 255 will be rocked to turn their respective shafts 256, 257 to close the associated switches.

Should non-corresponding pins 110, 111 be elevated, indicating a change of designation of the cards, either one or the other of the pawls 222, 223 will be raised first to operate its slide 239 or 225, with the result that one of the bell cranks 243, 244 will be actuated to cause its pawl 245 or 246 to move the slide 247 through its primary movement. The pawl not actuated will then engage the associated second tooth 249 of said slide preparatory to moving the latter through its secondary movement when the bell crank on which the latter pawl is mounted is actuated by the lifting of the other pawl 222 or 223 when it contacts with one of the pins 110 or 111 following the operation of the other of said latter pawls. The secondary movement of the slide 247 will actuate the lever 253 or 252, depending upon whether an A or B total is to be taken, and the actuation of said lever will swing its bail so as to turn the proper shaft to close the switch 237 or 238 to thereby stop the feed section of the machine for one cycle by maintaining the solenoid 59a de-energized and initiate a total-taking operation. Upon conclusion of the described operation and while the scanning frame 211 is being restored to its starting position, the restoring bail 270 is reciprocated by a crank 271 on the shaft 272 to trip the pawls 245, 246 so as to disengage them from the teeth of the slide 247 which then restores to its normal position under the influence of its spring 269. One end of the shaft 272 (Fig. 2) is joined, by a crank 273, to the upper end of a link 274, the lower end of which is connected to a crank 275 mounted on a shaft 276 which also carries a crank 277 controlled by a cam 278 (Fig. 7) on the shaft 58 so that the shaft 272 will be rocked to reciprocate the bail 270 in timed relation with the movement of the scanning frame 211.

It will now be apparent that the taking of an A or B total will be controlled from either the sensing station 79 or the analyzing station 81, depending upon the relative positions of the elevated pins at said stations and also upon the pre-selection of either of the levers 252 or 253 for operative association with the slide 247.

*The accumulators*

The accumulator units 191 and 192 of the upper and lower assemblies are identical in construction and each comprises the upper and lower plates 341 and 342 carrying the wheels 343 and 344, and said plates are joined by links 345 rockingly supported on rods 346 secured to the front and rear portions 347 and 348 of the reciprocatory accumulator frame. This construction permits the wheels 343, 344 and their respective plates to be adjusted to the adding, subtracting and neutral positions previously mentioned, and a spring detent 349 carried by the upper plate 341 engages with a rack 350 on the frame portion 347 to retain the wheels in any one of said positions until a changeover to another position is controlled by the associated control member 210 in the manner to presently appear. A sliding detent 351 mounted on the lower plate 342 is engageable with the teeth of the wheel 344 and said detent has a sliding connection with a trip 352 pivoted to the upper plate 341 and disposed so as to contact with the stationary bar 353 when the accumulator is advanced with the wheels in either adding or subtracting position, to thereby release the detent 351 from the teeth of its wheel to permit its rotation. If the accumulator unit is in neutral position, the reduced portion of the stationary bar 353 will enter the notch 354 in the trip 352 upon advancement of the unit, and the detent 351 will not, therefore, be disengaged from the teeth of the wheel 344.

*Accumulator position control unit*

This unit, which is best illustrated in Figs. 8 and 22, is designed to control the adding, subtracting and neutral positions of the accumulators 191, 192 in accordance with the settings of the transfer pins 209 of the auxiliary section of the lower transfer unit 133 and their effect upon the feeler members 210 which form part of the control unit. The latter comprises a frame 355 removably mounted between the walls 35, 37 of the machine and situated beneath said auxiliary section of the unit 133 so as to locate the feelers 210 in operative association with the pins 209 to be thereby controlled during each cycle of operation. For each feeler 210, which is individual to a set of upper and lower accumulators and is pivoted on a vertically movable bar 356 urged upwardly by springs 356a, there is provided a sliding interposer 357 engaged by the lower end of its feeler so as to be adjusted horizontally thereby to either one of three positions depending upon the position assumed by said feeler when it engages said pins 209. Said three positions of the interposer correspond to the adding, subtracting and the neutral positions of its set of accumulators and are identified on the upper edge of the interposer by shoulders 358, 359 and 360, respectively, all in different planes or at different heights and each adapted, in accordance with the position to which the interposer has been adjusted by its feeler, to vertically align itself with a stop lug 361 on the vertically movable control bar 362. In the raised position of said bar 362, its lug 361 is elevated slightly above the highest shoulder 359 so that it will not interfere with the free sliding adjustment of the interposer 357. Said bar 362 carries the upper and lower accumulator positioning slides 363 and 364 associated, respectively, with the accumulators 191 and 192, and controls the horizontal location of said slides relative to said accumulators by the extent of the variable downward movement of the bar which is, in turn, controlled by engagement of the lug 361 with one of the shoulders of the interposer 357. Thus, if said lug is aligned with the shoulder 359, then when the bar 362 has been lowered a slight distance, the lug will engage said shoulder, as in Fig. 22, to arrest the downward movement of the bar. When so arrested, the inner reduced extremity 365 of each slide 363, 364 will be aligned with the upper plates 341 of the accumulators so that when the slides are moved inwardly they will contact the adjacent ends of said plates 341 to cause reverse movements of the accumulator plates which movements, in the instance being described, will position the wheels 343 for operative engagement with the upper and lower accumulator racks 366 and 367 carried by the lower section 325 of the associated type bar when the accumulators are advanced toward said bar in timed relation to the downward or upward movement thereof, depending upon whether an accumulating or totalizing operation is to be performed. The adding position (Fig. 8) of the accumulators is similarly controlled by shifting the interposer 357 to align its lowermost shoulder 358 with the lug 361 so that downward movement of the bar 362 will be arrested in the position in which the ends 365 of the slides 363, 364 will be aligned with the lower accumulator plates 342 to thus advance the wheels 344 and retract the wheels 343 when said slides are operated. The third or neutral position of the accumulators is attained by aligning the shoulder 360 of the interposer 357 with the lug 361 so that the bar 362 will be arrested in its intermediate position wherein the ends 365 of the slides 363, 364 will be disposed in alignment with the space between the accumulator plates so that as the slides are operated, said plates will be engaged by the shoulders formed by said ends 365 and thus be shifted to a position which will adjust both wheels 343, 344 to neutral.

The control bars 362 associated with the various accumulators are raised to their elevated positions before the conclusion of a cycle of operation and, at the beginning of a succeeding cycle and before the type bars start their upward movement, the bars 356 are raised to cause their feelers 210 to sense the condition established by their respective pins 209 and associated bails 193 to 198 to thereby adjust the various interposers 357 to proper position before the bars 362 start downwardly. When all said bars 362 have been arrested in their downward movements by the interposers, the slides 363, 364 are operated to adjust the accumulators to the desired position and are then immediately retracted, and before the conclusion of said succeeding cycle of operation the bars 362 are again elevated.

The bars 362 are under the control of a common bail 368 which engages an extension 369 on said bars, and which is carried by the arms 370 secured to the rocker shaft 371. Said shaft also carries a crank 372 connected to the upper ends of links 373, the lower ends of which are joined to a follower bell crank 374 engageable with the cam 375 secured on the main cam shaft 50 and operable to actuate said bail 368 in the timed relation above mentioned.

The bars 356 are restored by a common bail 376 engageable with the lower ends of said bars and carried by arms 377 mounted on the rock shaft 378. A crank 379 on said rock shaft is connected to the upper end of a link 380 the lower end of which is joined to a bell crank 381 having a follower engageable with the cam 382 mounted on the shaft 50 alongside the cam 375. Said cam 382 moves the bail 376 upwardly at the beginning of a cycle to permit the bars 356 to be moved upwardly by their springs 356a so as to allow the feelers 210 to engage with the pins 209 and thereby effect adjustment of the interposers 357, after which said bars 356 are restored by said bail 376.

The slides 363 and 364 are controlled, respectively, by the common bails 383 and 384 connected by arms 385 to the rock shafts 386 and 387. Cranks 388 and 389 secured to the shafts 386 and 387 (Figs. 5 and 25) are connected to the upper ends of links 390 and 391 the lower ends of which are pivoted to a bell crank 392 having followers 393 and 394 which engage complementary cams 395 also mounted on the shaft 50. Said cams operate the bell crank 392 to simultaneously rock the shafts 386 and 387 in opposite directions so as to cause the bails 383, 384 to advance the slides 363, 364 to perform their respective functions, as previously described, and to then retract said slides preparatory to their next operation.

*Accumulator operating mechanisms*

The upper and lower accumulator frames including the portions 347, 348 are reciprocated in timed relation to the rise and fall of the type bars to engage either the wheels 343 or 344, depending upon whether there is to be a substracting or adding operation, with the accumulator racks 366 and 367 mounted on said bars. When adding or accumulating, said frames are advanced towards said type bars just before the latter start their downward movement, and during a totaling cycle the frames are advanced prior to the rise of said type bars.

The upper frame in which the sub-total accumulators 191 are supported, is reciprocated by a rock shaft 396 connected, by arms 397 (Fig. 5), to the ends of said frame, while the lower frame for the grand total accumulators 192 is operated by a rock shaft 398 connected, by arms 399, to the latter frame, and both of said shafts are differentially controlled with relation to their time of operation so that their respective frames may be advanced, as above mentioned.

Figure 10:
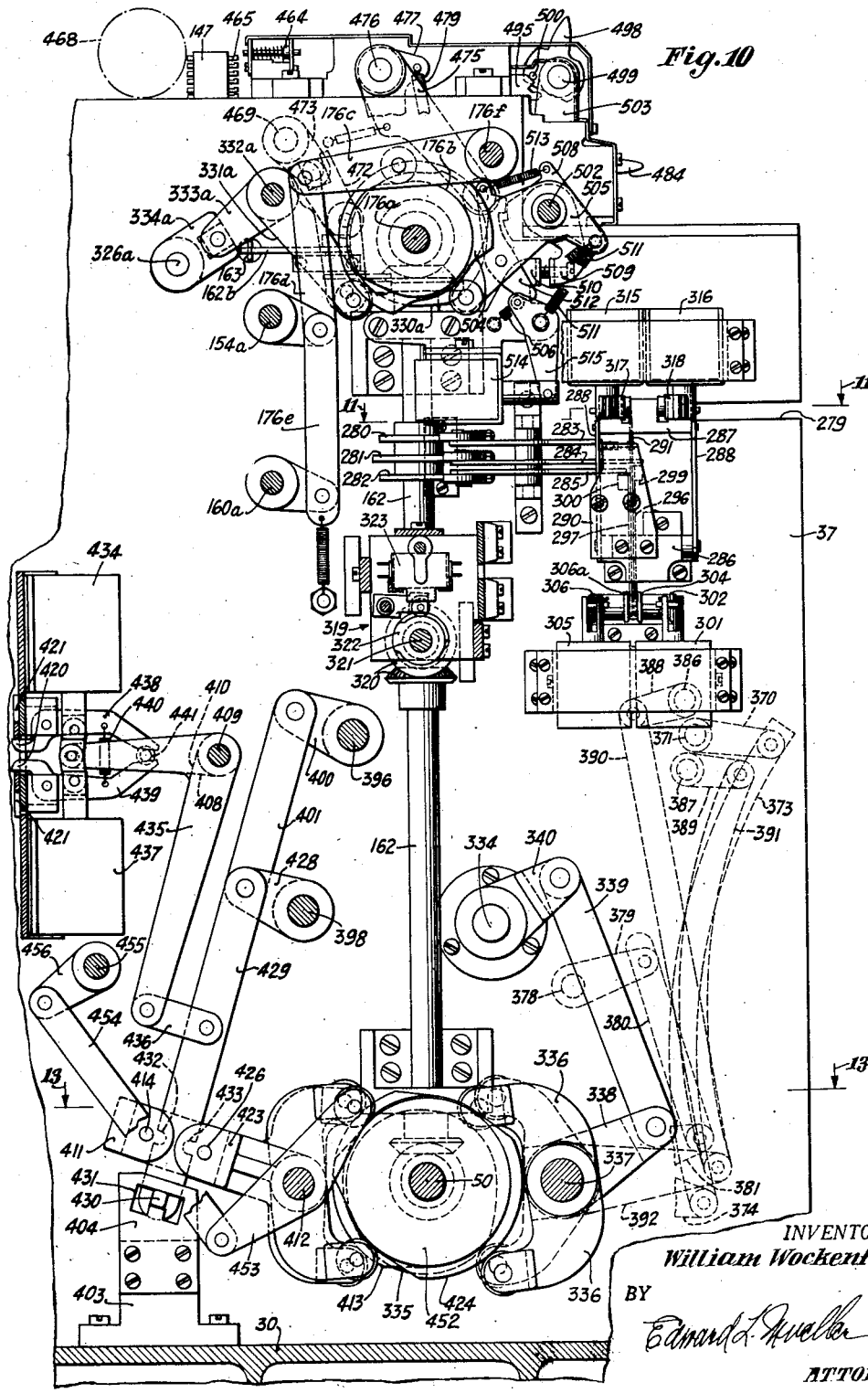
Fig. 10 is a section on the line 10—10 of Fig. 9.

With respect to the sub-total accumulators and as shown in Figs. 10 and 10a, the shaft 396 is connected, by the crank arm 400, to the upper end of a link 401 the lower end of which is movable relative to a vertically disposed lock plate 402 secured on the block 403 attached to the base 30 of the machine, said plate 402 being spaced from a similar plate 404 also secured on the block 403 and associated with the operating mechanism of the accumulators 192 presently to be described. Said plate 402 is provided with an inverted U-slot 405 in which is movable a lug 406 carried by the lower end of the link 401 which is adapted to assume a central or neutral position (similar to Fig. 10), a second position to the left, as shown in Fig. 10a, when an adding or subtracting operation is to be performed, and a third position to the right during a totaling cycle, and at the conclusion of each cycle the link is restored to its neutral position. To effect the adjustment of said link to its second position during an adding cycle, there is provided an add solenoid 407 which, when energized, swings the bell crank 408 to the position of Fig. 10a and, in so doing, rocks the shaft 409 to which said bell crank is attached. Thereupon, the links 410 connecting said bell crank with the link 401 swings the latter to the left. The energization of the solenoid 407 occurs at the moment that an oscillatory bail 411 mounted on the shaft 412 reaches its uppermost position under the control of the complementary cams 413 (Figs. 9 and 13), whereupon the bail and the link 401 are coupled together by engagement of a pin 414 on the bail in a notch 415 in the edge of the link. Under the influence of the cams 413, the bail 411 and the link 401 then move downwardly, with the lug 406 on the link entering the left hand branch of the slot 405 to thus prevent a return movement of the link 401 toward its neutral position so that the link and bail will remain coupled. The downward movement of said link rocks the shaft 396 counterclockwise to thereby advance the upper accumulator frame toward the type bars the instant before they start their restoring movement. Under the influence of the cams 413, the bail 411 dwells in its lower position while accumulation proceeds, and at the conclusion thereof and after the solenoid 407 has been de-energized, the bail again rises and, through its coupling to the link 401, rotates the shaft 396 clockwise to retract the accumulator frame. When the bell crank 408 is operated by the energization of the solenoid 407, as described, a pin 416 on said bell crank raises a restoring lever 417 against the tension of spring 418 connecting said lever with a similar lever 419 so that upon restoration of the link 401 to its raised position by the bail 411 and consequent disengagement of the lug 406 from the left branch of the slot 405, the spring 418 will become effective, through the lever 417 and the pin 416, to swing the bell crank 408 downwardly and thus operate the link 410 to return the link 401 to neutral position. The pivotal movement of the lever 417, and consequently of the link 401 to neutral position, is limited by engagement of the end 420 of said lever with a stop 421.

When a change of designation takes place to initiate a total-taking cycle, the sub-total solenoid 422 (Fig. 10a), located directly below the solenoid 407, is energized before the type bars start their upward movement. The solenoid 422 operates to pull the bell crank 408 downwardly to reverse the previously described shifting of the link 401 so that its lug 406 will be moved from its neutral position into alignment with the right hand branch of the slot 405. This occurs when the bail 423 mounted on shaft 412 is in its uppermost position under the control of the complementary cams 424 on the shaft 50. As a result of the shifting of the link 401, its notch 425 will receive the pin 426 on said bail 423 to thus couple the latter to said link, and upon downward movement of the bail, with the lug 406 entering the right hand branch of the slot 405, the shaft 396 will be turned counterclockwise to advance the upper accumulator frame as previously described but prior to the upward movement of the type bars. Lowering of the bell crank 408 causes its pin 416 to also rock the lever 419 downwardly against the tension of the spring 418 so that the latter will become effective to restore the link 401 to its neutral position when the bail 423 swings upwardly under the influence of the cams 424, the solenoid 422 having previously become de-energized.

Referring now to Figs. 10 and 10b, the control of the rock shaft 398 which advances and retracts the lower accumulator frame whose accumulators are utilized for grand total operations, will now be described. Said shaft 398 being connected by arms 399 to the lower accumulator frame, is also connected, by the crank arm 428, to the upper end of the link 429 similar to but shorter than the link 401 and having a lug 430 movable in the slot 431 formed in the lock plate 404. The link 429 is provided in its edges with the opposed notches 432 and 433 adapted, respectively, to receive pins 414 and 426 of the two bails 411 and 423 when said link is shifted from its neutral position to the left during a grand total adding operation or to the right (Fig. 10b) during a totalizing operation. When it is desired to accumulate in the grand total accumulators 192, the grand total add solenoid 434 is energized during the adding cycle and with the bail 411 in its uppermost position. Operation of said solenoid swings the bell crank 435 clockwise about the shaft 409 and, through the connection 436, the link 429 is swung to the left so as to couple the same with the bail 411 which thereupon moves downwardly with said link to rock the shaft 398 and thus advance the lower accumulator frame. During this operation the lock plate 404 performs the same function as the plate 402 in preventing restoration of the link 429 to neutral position before the bail 411 is again raised. The adjustment of the link 429 to its right hand position, as shown in Fig. 10b, preparatory to a grand totalizing operation, is accomplished through the energization of the total solenoid 437 which occurs before the type bars start upwardly and which reverses the previously described operation of the bell crank 435 to shift the link 429 to its right hand position where it will be coupled to the bail 423 so that, under the control of the cams 424, the lower accumulator frame will be advanced to accomplish the rolling out of the totals from the accumulators 192. Levers 438 and 439, similar to levers 417 and 419 and connected by the spring 440, are operatively associated with a pin 441 on the bell crank 435 so as to effect restoration of the link 429 to neutral from either of its shifted positions when the solenoids 434 and 437 are deenergized and the bails 411 and 423 have been raised.

*Carry over units*

Each of these units, as shown in Figs. 8 and 22, comprises a stationary frame 442 mounted on the back of the machine in proximity to and across its associated bank of accumulators. In said frame are mounted the carry over slides 443 yieldably urged inwardly by the springs 444 and eaching having its inner end disposed between the accumulator rack 366 or 367 of one type bar and the adjacent type bar of the next higher order so as to be controlled by its associated accumulator and, in turn, control the accumulator rack of the latter bar. This control involves either the arresting of said higher order rack in its zero position (Fig. 8) just prior to the time its type bar reaches the extent of its downward movement, as when no carry over is to be effected, or the continued movement of said rack with its type bar (Fig. 22a) in which event said rack will carry one into the accumulator wheel of the higher order. Said control is accomplished by a laterally extending stop lug 445 struck from the slide 443 and either disposed in the path of the shoulder 446 on the higher order accumulator rack to arrest the same at zero position, or which is removed from said path upon operation of the slide 443 when a carry over operation is to be accomplished. Said slide 443 is operated either by a high tooth on the subtracting wheel 343 engaging the projection 447 at the inner end of the slide or by a high tooth on the adding wheel 344 contacting the projection 448 of said slide. In either event the slide is forced outwardly against the tension of its spring 444 and when this occurs a normally tensioned leaf spring 449 carried on a vertically movable frame 450 engages the extremity of the projection 451 on said slide to retain the same in its operative position. When the slide is thus adjusted, its lug 445 will be out of the path of the shoulder 446 of the descending accumulator rack carried by the type bar of the next higher order and said rack will therefore travel with said bar to the extent of downward movement of the latter and thus accomplish the carry over into the accumulator wheel engaged with said rack, whereupon the accumulator is retracted as previously described. Before the type bar again starts its upward movement in the next cycle of operation, a cam 452 (Figs. 9, 10 and 13) on the shaft 50 operates a follower 453 mounted on the shaft 412 and connected to a link 454 which is joined to the rock shaft 455 by a crank 456. Said shaft 455 is connected by the cranks 457 to links 458 pivoted to the lower end of the vertically movable frame 450 and through the foregoing connections said cam elevates the frame. When this occurs, a common restoring plate 459 for each of the carry over units and mounted on said frame 450, moves upwardly to engage the shoulders 460 of any of the accumulator racks 366 or 367 which have been moved downwardly to carry over position. Said engagement raises said racks from the position of Fig. 22a to their zero positions shown in Fig. 8. At the same time, the springs 449 of the operated slides 443 are carried upwardly with the frame 450 and are thus disengaged from the extremities of the projections 451, allowing the springs 444 to restore said slides inwardly so that their lugs 445 will again be positioned beneath the shoulders 446 of the racks to thus retain them in zero position in which they must be in the event that a total-taking cycle is initiated and the accumulator wheels are thrown into mesh with their racks before the type bars start upwardly. As soon as the slides 443 have been restored, the cam 452 permits the frame 450 to move downwardly under the influence of the springs 461 connected to the cranks 457.

*Accumulator split*

Means are provided for splitting the accumulators and thereby disabling the carry over mechanisms at any desired point or points. For this purpose, each carry over unit has mounted on its frame 442 an interposer 462 for each accumulator rack. Each interposer is slidable from a normally inoperative position shown in Figs. 8 and 22 to an inward operative position wherein it is frictionally held with its inner end disposed in the path of the shoulder 463 on the associated accumulator rack so as to arrest the downward movement of said rack at its zero position and thus prevent it from accomplishing a carry over operation into the next higher order.

*Printing unit*

This unit, which is best illustrated in Figs. 8, 10 and 21, comprises the hammer control mechanism, the hammer lock-out, and means for eliminating zeros to the left and right of significant figures.

The printing is accomplished by firing pin 464 for each type bar which is operated to strike the aligned type 465 when the associated hammer 466 is released and thereupon propelled by its actuating spring 467, thus causing the type to print upon a record sheet mounted on the platen 468. Any well known type of paper and ribbon feed mechanisms may be employed in conjunction with said platen and are omitted from the illustration since they form no part of the present invention. However, in the circuit diagram of Figs. 26 and 27, reference is made to the electrical control of the paper feed. The hammers 466 are mounted to swing about the shaft 469 and, after performing a printing operation, are restored by the common bail 470. This restoration is accomplished by a cam 471 (Figs. 5 and 24) mounted on the shaft 176a just inside the wall 37 and adapted to operate a follower 472 coupled to a crank 473 on the shaft 469. A second cam 474 on said shaft controls a follower 475 on the shaft 476 (Figs. 8, 10 and 24) to rock said shaft and thereby, through its bell cranks 477, actuate the reciprocatory hammer release bail 478 to release the hammers at the amount the type bars have reached their printing position, as will presently be more fully explained. The bail 478 is thereafter restored by the springs 479 connected to the bell cranks 477.

To accomplish the release of the hammers, each has associated therewith a rockingly supported and vertically movable interposer 480 which, in the position of Fig. 8, is inoperative and permits the bail 478 to pass beneath the shoulder formed by the reduced lower end of the interposer so that the hammer 466 will not be released with the type bar in the blank position shown. However, should the type bar move upwardly and be arrested to align its uppermost or 0 type with the pin 464, this movement permits the lever 481, the rear end of which engages under a shoulder on said bar, to turn clockwise one step under the influence of the spring 482 connecting the same with its interposer 480. The forward end of said lever has a pin and slot connection with the interposer so that said movement will pull the latter downwardly to project its left edge of the enlarged portion thereof into the path of the bail 478. With the parts in the 0 printing position, the projection 483 on the interposer will, upon said downward movement, still be in alignment with the rear extremity of the zero elimination control lever 484 in its intermediate position. Said lever is pivoted to the hammer release plate 485 whose rear extremity 486 engages the hammer 466 to hold it in inoperative or restored position. With said lever and plate secured together by the pivotal connection therebetween, it will now be apparent that upon operation of the bail 478, the interposer 480 will be moved forwardly and its projection 483 will contact the rear extremity of the lever 484 to impart a similar movement to the latter and to said plate 485 to retract the end 486 of the latter from the hammer and thus permit it to fire and print a zero. Immediately thereafter, the bail 478 is retracted by the springs 479, the bail 470 restores the hammers 466 and, upon downward movement of the type bar, the lever 481 is rocked counterclockwise to lift the interposer 480 to its inoperative position, with the bail 487 (Fig. 8) attached to the bail 478 acting to restore the plate 485 and lever 484 so that the extremity 486 of said plate will again engage the hammer 466. Springs 488 connected to the plates 485 also aid in restoring them to hammer locking position.

Should the type bar, in its upward movement, be arrested in position to print a 1 or a digit of higher order, the upward movement of said bar will permit the lever 481 to move an additional step which will lower the interposer 480 sufficiently to align its projection 483 with a projection 489 on the plate 485 so that forward movement of the interposer under the influence of the bail 487 will cause the plate 485 to assume its hammer releasing position and, incidentally, carry its lever 484 with it.

*Zero elimination*

Zero elimination to the left or right is accomplished by, respectively, depressing or raising the front ends of the levers 484 from their intermediate positions, and said levers are all frictionally held in their three adjusted positions by the spring latches 490. When eliminating to the left in any group of columns to which a set of type bars is assigned, all levers 484 individual to said columns are depressed and, in so doing, the inner extremities of said levers will be elevated so that when the bail 478 is advanced to actuate the interposers 480 the projections 483 thereon will enter the spaces between said extremities and the projections 489 on the plates 485 and the latter will not, therefore, be advanced to release their respective hammers 466. However, a significant figure in any one of said columns will be printed because, in that case, the interposer 480 will be lowered to its second step, as previously described, and the projection 483 thereon will be aligned with the projection 489, thus causing the plate 485 to be advanced when the interposer is operated. The appearance of a significant figure in any one of said columns results in a zero being printed in the column or columns to the right of the first named column in which the zero would have otherwise been eliminated. This is accomplished by providing each of the levers 484 with a laterally offset and forwardly extending lug 491 projecting through and to the right of the plate 485 on which said lever is pivoted. When said lever is depressed, said lug 491 will be horizontally aligned with a rearwardly extending lug 492 formed on the plate to the right of said lever and offset to the left of said plate. Consequently, as the plate 485 individual to the significant figure to be printed is advanced to release its hammer, the lug 491 of the lever carried by said plate will contact the lug 492 on the plate to the right and thereby also advance the latter plate which will then release its hammer to print a zero. In the same manner, any other plate to the right of the last named plate which would normally eliminate the printing of a zero because of the depression of its lever, would be advanced, due to the presence of the mentioned significant figure, by engagement of its lug 492 with the lug 491 of the lever carried by said last named plate, and a zero would therefore be printed because of the consequent advancement of said other plate.

Zero elimination to the right is effected by raising the levers 484 individual to the columns in which such elimination is to occur. This adjustment of the levers lowers their rear or inner extremities so that they are now positioned in overlapping relation to the projections 489 of their respective plates. When so located, the projections 483 on the associated interposers 480 will pass over the inner ends of said levers when the interposers have been lowered only one step by the levers 481 and then advanced by the bail 478. Therefore, each projection 483 will fail to engage either its lever 484 or its plate 485 and the latter will not be moved forwardly to release its hammer. When a significant figure is to be printed in one of said columns, the interposer 480 individual thereto is lowered sufficiently by the lever 481 to allow its projection 483 to align with the projection 489 on the associated plate 485 so that the latter will be operated to release its hammer when the bail 478 is advanced to actuate said interposer. The lever 484 of the plate which controls the printing of said significant figure effects the printing of a zero in the column to the left by means of the forwardly extending lug 493 on said lever, which lug is offset to the opposite side of the lever from the lug 491 thereon. Said lug 493, under the condition being described, is aligned with a rearwardly extending lug 494 on the plate 485 to the left of said lever and said lug 494 is offset in the opposite direction from the lug 492 on said plate and will therefore be horizontally aligned with said lug 493. Hence, when the plate which controls the printing of said significant figure is actuated to release its hammer, said lug 493 of the lever attached to said plate will engage said lug 494 on the plate to the left and operate the latter to also release its hammer so that a zero will be printed to the left of the significant figure. In a manner which will now be understood, a zero will be printed in any other column of the group under consideration which is to the left of that just described, by reason of the fact that the lug 493 of the lever to the right will engage the lug 494 of the plate individual to said other column and thus actuate said plate to release its hammer.

*Hammer lock-out*

The operation of locking out a hammer 466 occurs at the beginning of a listing cycle and before the type bars start their upward movement, and is effected by preventing downward movement of the associated interposer 480 which has been restored to the position of Fig. 8 at the conclusion of the previous cycle when the associated type bar depressed the adjacent end of the lever 481. Under this condition, the bail 478, when advanced, will pass under the shoulder formed in the adjacent edge of the interposer and will not operate the latter. To lock up the interposer, there is provided a detent 495 normally held in its inoperative position by the spring 496 so that its rear end will be held out of the path of the shoulder formed by the recess 497 in the adjacent edge of the interposer. A lock-out key 498 for each detent is free to turn on an oscillatory bail 499 and as the latter is swung to the left, as viewed in Fig. 8, and the key 498 is in its inoperative position as shown, a pin 500 on said key will ride over the upper edge of the detent and will not, therefore, urge the same rearwardly. However, when the key is pre-set by pushing it rearwardly about the bail 499 to engage the pin 500 in the notch 501 of the detent and said bail is then swung rearwardly at the beginning of the operating cycle, the rear end of the detent will enter the recess 497 to engage the mentioned shoulder formed thereby, and the interposer will therefore be held in its raised position and its associated hammer will not be fired.

The bail 499 is operated from a rock shaft 502 to which it is connected by links 503 at opposite ends of the bail. A section of said shaft 502 extends between the walls 37 and 37a and on this section thereof a cam 504 (Figs. 9, 10 and 14) on the shaft 176a controls the rocking action of said shaft 502. For this purpose, the follower bell crank 505 engages the under portion of said cam and is loosely mounted on said shaft 502, and is held in engagement with the cam 504 by the spring 506. A collar 507 pinned on said shaft 502 carries a clutch plate 508 and further has stop member 509 engageable with a rigid part 510 to limit clockwise turning movement of the shaft. A spring 511 urges said clutch plate clockwise. Pivoted to an intermediate portion of the bell crank 505 is a clutch pawl 512 the upper end of which is connected by a spring 513 to the upper extremity of the clutch plate 508. Said pawl 512 moves with the bell crank 505 and cooperates with the plate 508, in the position of Fig. 10, to turn the shaft 502 counterclockwise to thus swing the bail 499 rearwardly at the beginning of each cycle during listing operations. Upon initiation of a total-taking cycle, a solenoid 514 is energized to rock the bell crank 515 clockwise and thus, by its engagement with the lower end of the clutch pawl 512, trip said pawl to its inoperative position relative to the plate 508. The bell crank 505 will be operated by the cam 504, but since the pawl 512 will not now operate the plate 508 and since said bell crank is loose on the shaft 502, the latter will not be turned and the lock-out mechanism will not operate during said total-taking cycle, with the result that all hammers will be fired to print the totals. Upon de-energization of solenoid 514 and continued rotation of the cam 504, the pawl 512 will be restored by the spring 513 to its operative position relative to the clutch plate 508 so that upon next actuation of the bell crank 505 by the cam 504, the pawl will drive the plate 508 to again turn the shaft 502 to operate the lock-out mechanism.

*Circuit controlled operations*

Referring now to Figs. 26 and 27, closure of the switch 516 energizes the motor 41 to drive the shafts 44 and 55 and connected gearing, and operation of the card feed mechanism awaits depression of the start key 131a which is then held down for two complete cycles of the machine to allow cards to be fed into the stations 79 and 81. Depression of said key during these two cycles establishes a circuit from the line conductor 520 through the normally closed contact of stop key 517 which may be depressed at any time to stop operation of the machine at the end of a cycle, then through the contact of start key 131a and the winding of the start relay 521 to the other line conductor 522. As long as said key is held down, said circuit will hold relay 521 energized to close its front contacts 521a, 521b, 521c (Fig. 27) and open its back contact 521d.

Depression of the start key also immediately closes a circuit for the feed clutch solenoid 59a extending through the contact of said key, the back contacts 523a and 524a of the group control relays 523 and 524, winding of the solenoid, and the switch 65a of the switching unit 60 (Fig. 7) which switch is closed at this time by its feed cam 63a. The solenoid 59a thereupon operates to release the clutch pawl of the clutch 59 which then couples the drive shaft 44 through the shafts 53 and 55, to the control shaft 58 for operating the feed and analyzer mechanisms and also said switching unit 60 which includes the various feed cams 63a, 63b, etc. Cam 63a is operative only for sufficient time at the beginning of the cycle to establish an energizing impulse for the solenoid 59a and to permit the clutch 59 to couple said shafts, and said cam thereafter opens the switch 65a until the end of the cycle is approached, whereupon the switch is again closed to re-energize said solenoid so that shaft 58 will continue to be driven through the next cycle unless a change of designation takes place.

The timing of the various feed cams 63a, etc. and print cams 322a, etc. is indicated throughout the circuit by make (M) and break (B) degree indications.

The first two cards are fed to the stations 79, 81 to cause, by their presence, the successive operation of switches 131g and 131h (Fig. 20b) thereat, and when both said switches have been operated by the sensing of said cards and the key 131a is thereafter released, two holding circuits are established for the start relay 521. The first of these circuits extends through the contact 521a and the switch 65b controlled by the feed cam 63b, and the other of said holding circuits is established by the relay contact 521b and extends through the normally closed contact 525a of the total stop relay 525 (Fig. 27), the normally closed stacker chamber switch 91a, the now closed switch 66d of the card feed magazine, the lower contacts 131g₁ and 131h₂ of switches 131g and 131h when they are closed by the sensing of cards at both stations 79, 81, and from thence through the closed contact of the stop key 517. The first holding circuit for relay 521 is provided so that whenever the stop key 517 is depressed, or a card fails to enter either of the chambers 78, 80, or the feed magazine becomes empty, or the stacker chamber is filled to thus open the second holding circuit, said relay will be held energized by the cam 63b for sufficient time to permit the machine cycle to be completed.

At the beginning of the first operating cycle, the sensing pins 104 of the two pin boxes 103, 103a are at their extreme upper positions and therefore all pins 110, 111 and the control pins 112 are elevated, and said pins are locked by the plates 114 so that when the scanning device 211 starts its advance, the pawls 222 and 223 will be simultaneously raised by pins 110 and 111 at stations 79 and 81, and the pawls 223 will cause operation of the bars 136, and the locking of the control pins 112 also results in the actuation of the bars 137, but the operation of said bars 136, 137 has no effect at this time since the shaft 50 is not yet coupled to the shaft 44 by energization of the print solenoid 51a. As the sensing pins recede and then start their upward or sensing stroke during the first cycle, the first card is being fed from the magazine and reaches its stop position at station 79 just prior to the entrance of said pins into the card chambers 78 and 80. At this time, pins 110, 111 have been unlocked by the plates 114 and the scanning device 211 is approaching the end of its first return movement so that said pins are in lowered position for actuation by the sensing pins 104 at the two stations as the latter pins are completing their first sensing operation. Certain pins 110 at station 79 are actuated by the sensing of holes in the card now at said station, while all the pins 111 at station 81 are elevated because of the absence of a card thereat, and when said pins 110, 111 are so actuated they are locked by the plates 114 and the sensing pins 104 recede to start their second cycle. The first card which was at station 79 is now fed to station 81 while the sensing pins 104 are receding and starting their second upward movement and, at the same time, the second card from the magazine is fed into station 79. With the pins 110, 111 locked, as above mentioned, the scanning device again advances in its second cycle and, since there is now a non-comparing condition at the two stations, scanning pawls 222, 223 are actuated at different instants to cause the operation of the group control mechanism. This results in either one or both of the switches 237 or 238 being operated, whereby a total-taking operation will be initiated in the following cycle during which the feeding of cards will be stopped. As will be seen, all type bars 147 will be raised in this latter cycle to their blank positions, but the accumulators and the T-print indication will be suppressed so that no printing or accumulation will occur.

During the first sensing cycle of the pins 104 and with the shaft 50 stationary so that the print-control switching unit 319 (Fig. 10) is inactive, the switch 323a controlled by the print cam 322a is closed and when the feed cam 63c closes its switch 65c, at approximately the middle of the cycle, an energizing circuit for relay 526 is established across the line conductors 520, 522 and through the winding of said relay, the switch 65c closed by the cam 63c, conductor 527, and switch 323a controlled by the cam 322a. Switch 65c remains closed until the feed cam 63d is operative, whereupon the cam 63c opens to release relay 526. Upon closure of switch 65d by its cam 63d and before the switch 65c is opened, relay 528 is energized through the switch 65d and the front contact 526a of the relay 526, and a holding circuit for relay 528 is closed through the front contact 528a thereof and maintained into the next cycle by the cam 63d. Relays 526 and 528 are energized during the initial two cycles and into the third or total-taking cycle of the machine because in subsequent listing and adding operations when cam 322a closes and opens its switch, the cam 63c closes its switch 65c only during an interval when the switch 323a is opened. In other words, relay 526 can only energize when the print section of the machine is idle and cam 322a is stationary and in position to close the switch 323a, which is the condition existing at the beginning of the operation. Relay 528, when energized, acts to suppress the T-print and accumulator operations and the paper feed. These suppressions are effected by the opening of the relay back contacts 528b, 528c and 528d which, during the total-taking cycle when the relays 526 and 528 are no longer energized, remain closed until a card run is completed so that normal printing and accumulating operations to be described will be accomplished during said run. Opening of contact 528b opens the energizing circuit for the T-print solenoid 305, the back contact 528c opens the energizing circuits for the accumulator solenoids 407, 422 and 434, and the contact 528d opens the circuit for the paper feed solenoid 540.

At the end of the first sensing operation by the pins 104, when the previously mentioned non-comparing conditions exists at the two stations 79, 81 resulting in the operation of the group control mechanism and subsequent initiation of a total-taking cycle by the operation of one of the switches 237 or 238, group control relays 524, 529 or 523, 530 are energized, depending upon which one of said switches is operated. The energizing circuit for relays 524, 529 is controlled by the now stationary print cam 322b which, at this time, closes its switch 323b to thus establish a circuit through the windings of said relays and the switch 237 which is assigned to the taking of A totals. If the switch 238 individual to B totals is closed, the relays 523, 530 are energized, also by the closure of the switch 323b. Holding circuits for the two groups of relays are now established through either the front contact 529ᵃ of relay 529 or the front contact 530a of relay 530, and said holding circuits are maintained until the switch 323B is opened in the total-taking cycle. After said holding circuits are established, the switch 237 or 238 is opened by the restoration of the slide 247 of the group control mechanism. Energization of either set of relays 524, 529 or 523, 530 prepares independent circuits for the group indications which are to follow the total-taking cycle and which will be subsequently described.

Closure of either switch 237 or 238 in the above described operation results in the opening of the back contacts 523a or 524a of the respective relays 523, 524, thereby interrupting the energizing circuit for the feed solenoid 59a which will control the stop pawl of its clutch mechanism 59 to interrupt the rotation of the feed control shaft 58 upon completion of its revolution, and with the sensing pins 104 in their uppermost positions at the conclusion of their second sensing operation. At the same time, a circuit is established for the print clutch solenoid 51a extending through the now closed switch 323a, the winding of the solenoid, the front contact 523b and from thence through the now closed contacts 131g₁ and 131h₂ and the stop key 517, or through the front contact 524b and the back contact 523a to said stop key. Solenoid 51a energizes to render operative its clutch mechanism 51 which then couples the shaft 44 to the main timing shaft 50 for the printing unit, and the operation of said shaft through one revolution results in the type bars moving upwardly to their blank positions and then being returned. As soon as shaft 50 has been coupled and started its rotation, print cam 322a releases its switch 323a to break said energizing circuit for the solenoid 51a, and toward the end of the rotation of said shaft said cam 322a again closes its switch and maintains it closed into the next cycle to prepare the energizing circuit of solenoid 51a for its next closure. Print cam 322b also opens its switch after the switch 323a is opened, and again closes its switch before the end of the cycle. Opening of switch 323b breaks the holding circuit for the group control relays 524, 529 or 523, 530 which then release to close the back contacts 523a and 524a thereof.

Closure of back contacts 523a and 524a re-establishes the energizing circuit for the feed solenoid 59a through the alternate circuits previously described so that upon completion of the total-taking cycle, the feed mechanism will again start operating to close the switch 65b which controls one of the alternate holding circuits for the start relay 521. The sensing pins 104 have, at the end of their second cycle when they were stopped by the cessation of the feed operation, already sensed the cards at both stations, and the sensing pins 131b thereat have engaged said cards so that both the switches 131g and 131h are held operated by the plungers 131c. This closes the lower contact 131g₁ and opens the contact 131g₂ of switch 131g, and also closes contacts 131h₂ and 131h₃ of switch 131h. Closure of said contacts 131g₁ and 131h₂ established the previously described alternate holding circuit for the start relay 521. Upon closure of the contact 131h₃ by the sensing of the presence of a card at station 81, an energizing circuit for the print solenoid 51a is closed through switch 323a, winding of the solenoid, contact 131h₃, the switch 65e which is closed at this moment by its feed cam 63e, and from thence through the alternate paths established by the front contacts 521a and 521b of the start relay 521. Energization of solenoid 51a couples the shaft 50 to the drive shaft 44 so that now both shafts 50 and 58 are being driven. Pins 104 now start downwardly at the beginning of the cycle following the total-taking cycle, leaving pins 110 and 111 in their locked condition which prevailed during the total-taking cycle. Upon scanning said pins, if they compare, indicating no change in the group indications, a listing and accumulating operation proceeds, with the data read from the card at station 81 being transmitted through the transfer units 132, 133 to the type bars and accumulators. As long as the successive cards fed to the two stations continue to compare, the feed and print solenoids 59a and 51a will be re-energized at the beginning of each machine cycle so that the feed and print sections will be constantly driven.

Accumulation of listed items into the accumulators 191 during the down stroke of the type bars is accomplished in each listing cycle by the energization of the sub-total add solenoid 407 which adjusts the mechanism of Fig. 10a to the position shown and thereby causes shaft 396 to be turned to advance the accumulators 191 into engagement with their racks 366 just before the start of the downward movement of said type bars. Energization of solenoid 407 is under the control of the print cam 323f which closes switch 322f to establish the circuit for said solenoid through the back contact 536b of the grand total relay 536 (Fig. 26), the contact 521c of the start relay, contact 533d of the sub-total relay 533 which is not energized at this time due to the fact that no group control relay is energized, and then through the contact 528c.

As previously described, upon the change of designation and consequent energization of either pair of the group control relays 523, 530 or 524, 529, depending upon the operation of the A sub-total switch 237 or the B sub-total switch 238, the feed control shaft 58 is stopped at the end of the cycle in which said change is sensed, and a total-taking cycle is initiated. If an A sub-total is taken, with the switch 237 closing, relay 529 closes its front contact 529b (Fig. 27) whereas if a B sub-total is to be taken, relay 530 closes its front contact 530b. In the first instance, the group indication relay 531 is energized through the switch 65f which has been closed by its feed cam 63f at the end of the previous cycle and remains closed through the total-taking operation and into the next adding and listing cycle due to the fact that said switch is closed by its feed cam 63f which is stationary during said total-taking operation. Relay 531 is thus maintained energized through its front contact 531a. Group indication relay 532 is energized and held in the same manner through its front contact 532a. Energization of said relays 531 and 532 close their respective front contacts 531b and 532b to prepare circuits for the group indication solenoids 315 and 316, respectively, through the switch 65g when it is closed by the feed cam 63g, such closure occurring after the total-taking operation has been concluded and the following adding and listing cycle has started. When solenoid 315 energizes, its interposer 317 (Fig. 11) will be lowered so as not to operate its associated bar 180 with the result, as previously described, that the type bars assigned to the printing of the A code designation will be operated to print the same. Likewise, energization of solenoid 316 will operate its interposer 318 so that the type bars controlled by the bar 183 will print the B code designation. When such printing has been accomplished, switches 65f and 65g are opened at the same time, and the group indication relays 531, 532 and solenoids 315, 316 are de-energized, and since they are not re-energized in the following adding and listing cycles, the interposers 317, 318 will operate their respective bars 180, 183 to suppress the printing of the code designations. In instances where both A and B code designations are to be printed simultaneously by the operation of both switches 237 and 238, both sets of group indication relays 524, 529 and 523, 530 will be energized to operate their respective solenoids 315, 316.

At the time said change of designation takes place and either pair of group control relays 524, 529 or 523, 530 is energized, contact 529c of relay 529 or contact 530c of relay 530 will close to prepare a circuit for the sub-total relay 533 which is completed, immediately after shaft 50 starts to rotate, by closure of the switch 323c under the control of its print cam 322c, said switch being connected in series, over the conductor 534, with the feed controlled switch 65f which is closed at this time. Energization of relay 533 in this circuit closes its contact 533a to establish a holding circuit therefor which is maintained until switch 323c is opened by its cam. Relay 533 also closes its front contact 533b to energize the sub-total solenoid 422 in a circuit extending through the switch 323d which is closed by its print cam 322d shortly after energization of relay 533, then through the winding of said solenoid, contact 533b, and contact 528c of relay 528 which is now de-energized. Solenoid 422 energizes before the type bars start their upward movement, thereby operating the mechanism of Fig. 10a to the reverse position of that shown so as to turn the shaft 396 and thus engage the upper accumulators 191 with their racks 366 whereby the totals in said accumulators will be rolled out and printed.

If only an A sub-total is being taken, then the type bars assigned to the taking of B sub-totals are suppressed, and vice versa. This is accomplished through the print solenoids 308 and 309, the former energizing when the type bars assigned to A total-taking are to be suppressed, and the latter solenoid being energized when B sub-totals are to be suppressed. The energization of the A print suppress solenoid 308 is prepared when the B group control relay 530 is energized to close its front contact 530d leading directly to said solenoid, and is established through the back contact 529e of relay 529 when switch 323c closes immediately after the beginning of the total-taking cycle, said circuit extending from said switch over the conductor 534 and through the switch 65f which is closed at this time. Solenoid 308 energizes to raise its interposer 313 (Fig. 11) which is then operated to actuate its bar 179 to thus suppress the group of type bars assigned to A total-taking. Similarly, print suppress solenoid 309 is energized through the front contact 529d of relay 529 and the back contact 530e of relay 530 when the type bars allotted to B total-taking are to be suppressed through the actuation of bar 184 by its interposer 314. It will be noted that if both group control relays 529, 530 are simultaneously energized to reverse their d and e contacts, neither solenoid 308 or 309 will be energized, and therefore both classes of sub-totals will be printed.

When the type bars for printing sub-totals have been arrested and the totals are printed, the T designation is also printed alongside each total by the energization of the T print solenoid 305. The circuit for said solenoid is partially prepared at the beginning of the machine operation when the first change of designation took place because of the absence of a card in the second station 81. At that time, a circuit was established, shortly after shaft 50 started its rotation, extending through the switch 323e closed by the print cam 322e, winding of the grand total relay 535, and either the contact 523c of group control relay 523 or contact 524c of relay 524. Relay 535 energized in this circuit and established a holding circuit through its front contact 535a which extends through the winding of the relay and the back contact 536a of another grand total relay 536 (Fig. 26), and said holding circuit is maintained throughout the entire run of cards through the machine and until relay 536 is energized by the closure of the grand total key 236, as will later appear. With relay 535 thus energized, a circuit is established for solenoid 305 extending through the switch 65f which is closed during the total-taking operation, conductor 534, switch 323c when the same closes immediately after the shaft 50 starts rotating, winding of solenoid 305, back contact 528b, front contact 535b of relay 535, and the holding contact 533a of relay 533. Energization of solenoid 305 raises the interposer 297 (Fig. 12) controlled by the cam 282 and lever 285, as heretofore described, so that the bar 181 will be operated to arrest, in proper position, the type bar or bars assigned to the printing of the T designation.

For certain types of analyses, it is desirable to stop the machine after the taking of a B total. For this purpose, and before a card run is started, the switch 519 is thrown to the reverse position from that shown in Fig. 27 and, in this position, will cause energization of the B total stop relay 525 when the B group control relay 530 is energized. The energizing circuit for relay 525 is established when the print cam 323f closes its switch 322f and extends from said switch over the conductor 543 and through the winding of relay 525, the switch 519, and the holding contact 532a of the B group indication relay 532 which is held energized, by switch 65f, after the total-taking cycle has been completed and until another feed cycle has been started. Upon energization of relay 525, its back contact 525a in the feed and print clutch circuits opens to prevent further energization of the clutch solenoids 51a and 59a and the machine will therefore come to a stop at the end of the total-taking cycle. After the total has been taken, the machine is re-started by operating the start key 131a and operation proceeds as previously described.

During any total-taking operation and before the type bars start downwardly, the grand total accumulators 192 are advanced into engagement with their racks 367 to accumulate the sub-totals which have been printed. This adding or accumulating operation is accomplished by the energization of the grand total adding solenoid 434 which then reverses the position of the parts shown in Fig. 10b so that the shaft 398 will be turned to advance the accumulators 192. At this moment in the operation, the sub-total relay 533 is still held energized by switch 322c and a circuit is therefore established for solenoid 434 through switch 322f which is closed by its cam before the cam 322c opens the switch 323c, then through the winding of solenoid 434, the front contact 533c of relay 533, and the contact 528c, whereupon solenoid 434 energizes to accomplish the advancement of the grand total accumulators.

Following the total-taking cycle, the feed section of the machine is re-started as above described, and listing and adding operations will continue until another change of designation takes place, or until the last card of a run is fed from the magazine 66. In the latter event, the switch 66d at said magazine will be operated to open its contact to thereby interrupt the energizing circuits for the clutch solenoids 51a and 59a and the machine will come to a stop at the end of the cycle. With cards still at stations 79, 81, start key 131a is again depressed and held closed until said cards are cleared. Upon analysis of the last card at station 81 and its subsequent discharge therefrom, a change of designation takes place and sub-totals are taken, as will now be understood, with the machine coming to rest at the end of the total-taking operation. A grand total may now be taken.

With no cards now in the machine, the grand total key 236 is depressed to energize the grand total relay 536 to open its back contact 536a and thus break the previously described holding circuit for relay 535, but said relay holds through switch 323e and the contact 535a until said switch is opened in the course of the total-taking cycle. Relay 536 energizes over a circuit extending from switch 65f in series with switch 323c both of which are closed at this time, winding of relay 536, contact 521d of the start relay, contact 131g₂, key 236, contact 131h₁, and the stop key 517, and a holding circuit for said relay is closed through the front contact 536c which remains effective until switch 323c is opened by its cam. Opening of the back contact 536b prevents energization of the sub-total add solenoid 407 during the grand total-taking operation. Closure of front contact 536d establishes an energizing circuit for the print clutch solenoid 51a through the now closed switch 323a, the winding of said solenoid, contact 536d and thence over the previously described holding circuit for relay 536 through the contact 536c. Shaft 59 is now clutched to drive the printing and accumulating section of the machine.

At the same time that key 236 is operated to energize relay 536, a circuit is also prepared for the grand total solenoid 437 through contacts 536c, 131g₂ and 521d, conductors 537 and 538, front contact 535d and the winding of said solenoid, and this circuit is completed through switch 323d when the latter is closed by its cam shortly after the shaft 50 starts rotating. Solenoid 437 operates to adjust the mechanism of Fig. 10b to the position shown so that the shaft 409 will be turned to advance the lower accumulators 192 to operative position relative to the type bars before the latter start their upward movement. With switch 323c closed and upon energization of relay 536, the G-print solenoid 301 is energized in the circuit through said switch, winding of said solenoid, conductors 539 and 537, and thence over the previously described circuit through the contact 536c. Solenoid 301 operates to raise the interposer 296 (Fig. 12) to its operative position where, under the control of cam 281 and lever 284, it will be operated to shift bar 181 and thus cause the type bar assigned to G-printing to be arrested in proper position.

An operating condition may arise when it is desired that no sub-totals be taken and only a final total be printed at the conclusion of a card run. In such instance, all keys 263 (Fig. 4) of the group control mechanism are set in neutral position, only the upper accumulators 191 are employed for adding and total-taking, the accumulator add solenoid 407 is energized as previously described to accumulate items being listed, the sub-total solenoid 422 is energized to take the total at the conclusion of the card run, and the T-print solenoid 305 is employed to print a T designation after said total. The listing and adding operations will proceed as described and when the last card has been cleared from station 81, the grand total key 236 is operated to energize the relay 536 as in the previously described grand total operation to, in turn, energize only the print clutch solenoid 51a and thereby initiate total-taking. Before the type bars start upwardly, solenoid 422 is energized through the switch 323d, the back contact 535e of the grand total relay 535 which is not now energized since neither group control relay 523 or 524 is operated, then over conductors 538 and 537 and through the previously described circuit including the stop key 517. As previously explained, energization of solenoid 422 in this circuit advances the accumulators 191 into operative position with respect to the type bars before they start moving upwardly so that the totals will be rolled out of said accumulators. When key 236 is operated, a circuit is immediately closed through T-print solenoid 305 by switch 323c, through the winding of the solenoid, contacts 528b and 535c, conductors 539 and 537, and thence through the key 236, and this circuit is held by the contact 536c until said switch 323c is opened by its cam. Energization of solenoid 305 accomplishes the same operation as previously set forth in connection with the printing of the T designation after sub-totals.

The solenoid 514, which controls the hammer lock-out mechanism of Figs. 8 and 10, is energized during sub and grand total operations so that all hammers 466, including those selected to be locked out by keys 498 during listing operations, are fired; and when said solenoid is not energized, the selected hammers are prevented from tripping and nothing is printed at the positions controlled by said hammers. During both types of total-taking operations, the energization of solenoid 514 is controlled by either the front or back contacts 533e and 533f of the sub-total relay 533. When taking a sub-total, said relay is energized to close its e contact, and upon closure of switch 323d, an obvious circuit is established for solenoid 514 which, upon energization, prevents the bail 499 from being operated and hence all hammers will fire. When a grand total is to be taken, relay 533 does not energize, with the result that the energizing circuit for solenoid 514 then extends through the f contact of relay 533, the conductors 538 and 537, and thence through the contact 536c of relay 536 which is energized when the grand total key 236 is operated.

The paper feed mechanism, which is not illustrated herein and which may be of any conventional design, is controlled by the feed solenoid 540. When listing, with the switch 518 in the position shown in Fig. 27, said solenoid is energized to advance the platen 468 during each machine cycle under control of the switch 323e which closes a circuit extending therefrom over the conductor 541, switch 518, winding of said solenoid, and contact 528d which remains closed after the first two cards of a run have been fed to stations 79, 81.

With the switch 518 shifted to the tabulating position, solenoid 540 is energized only when a sub or grand total is taken. In the former instance, either the group indication relay 531 or 532 is energized during the total-taking cycle and held into the next feed cycle as previously described and, immediately after the start of the latter cycle and before relay 531 or 532 de-energizes, switch 65g is closed to establish an energizing circuit for solenoid 540 extending from said switch through either contact 531c or 532c, the switch 518, and then through the winding of the solenoid and contact 528d. As will be recalled, when taking a grand total, only the print section of the machine is operated and hence the control of solenoid 540 is shifted from switch 65g to switch 323e. Therefore, when key 236 is operated, the grand total relay 536 is energized, as before, and in closing its front contact 536e, an energizing circuit for solenoid 540 is established through switch 323e, said contact 536d, conductor 542, switch 518, and thence through the winding of solenoid 540 and contact 528d.

What is claimed is:

1. In combination, an accumulator having variously adjustable positions and including interconnected and relatively adjustable plates, a position control mechanism for said accumulator including a control member having coordinate movements relative to said plates, one of said movements being variable in extent and the other movement effecting engagement of said control member with one or the other of said plates, means for controlling the extent of movement of the first named said controlled member to operatively associate it with either one or both of said plates, and means to thereupon impart said other movement to said control member to engage one of said plates to relatively adjust the same in accordance with the first named movement of said member.

2. In combination, an accumulator having variously adjustable positions, a position control mechanism including a movable member having a stop, a control member having coordinate movements one of which is with and the other relative to said movable member, an interposer having means thereon engageable by said stop when said control member is initially moved with said movable member to differentially interrupt said movement and thereby select the position to be assumed by said accumulator, an adjusting element for said interposer, card controlled means for operating said adjusting element, and means to thereupon secondarily move said control member relative to said movable member to actuate said accumulator in accordance with the interrupted position of said control member.

3. In combination, an accumulator having variously adjusted positions, a position control mechanism including a control member having coordinate movements relative to said accumulator for adjusting the same to any one of its positions, a unit including transfer elements having operative and inoperative positions, a set-up device common to all said elements for adjusting certain of them individual to said accumulator to operative positions, bail members engageable with said certain transfer elements and having locking and releasing positions relative thereto, means to control the relation of said bail members to said transfer elements, a rockingly supported feeler member movable into engagement with said certain transfer elements and adapted by such engagement to assume various rotative positions depending upon the condition of said bail members, an interposer controlled by the rocking of said feeler member and having means to differentially arrest one of the coordinate movements of said control member, and means to thereupon impart another of said coordinate movements to said control member to adjust said accumulator to a position corresponding to that in which said member is arrested.

4. In combination, an accumulator having a plurality of positions to which it may be adjusted, transfer elements for controlling the positions of said accumulator, bail members engageable with said transfer elements and movable thereby, interposers engageable with said bail members to prevent their movement and thereby denote one of the positions of said accumulator, means actuated by said transfer elements in cooperation with said bail members when the interposers are in engagement with the latter for determining a position of adjustment of said accumulator, and means then operable to adjust the accumulator to said position.

5. In combination, an accumulator having a plurality of positions to which it may be adjusted, transfer elements for controlling the positions of said accumulator, bail members engageable with and movable by said transfer elements, selectively operable interposers for said bail members movable from locking to releasing positions relative thereto to denote different positions of said accumulator, other transfer elements, means operated by the appearance of a control hole in any column of a card for operating said other transfer elements to release certain interposers which identify one position of said accumulator, means settable by the first named transfer elements to prepare said accumulator for adjustment to said position, and means to operate the last named means to adjust said accumulator to said position.

6. In combination, an accumulator having a plurality of positions to which it may be adjusted, transfer elements having operative and inoperative positions, means to render certain of said transfer elements operative for controlling the positions of said accumulator, bail members engageable with and movable by said certain transfer elements, locking elements for said bail members and said certain transfer elements to prevent movement thereof, other transfer elements for actuating certain of said locking elements to release the associated bail members, means operable to sense the release of said bail members by moving the same and the transfer elements engaged therewith, mechanism responsive to the operation of said sensing means to determine a position of adjustment of said accumulator, and means to then adjust said accumulator to said position.

7. In combination, an accumulator having a plurality of positions, differentially controlled means for adjusting said accumulator to said positions, a pair of movable transfer elements for said accumulator, means to alternatively lock either one or both of said transfer elements against movement to thereby denote the position to be assumed by said accumulator, means engageable with and actuated by said transfer elements to sense the condition thereof, and means operated by said sensing means upon actuation thereof for differentially controlling said accumulator adjusting means in accordance with the condition of said transfer elements.

8. In combination, an accumulator having movements to adding and neutral positions, a listing type bar from which items from cards are accumulated in said accumulator when in adding position, settable transfer pins, means to set said pins for controlling the movements of said accumulator, means co-acting with said settable pins and controlled by the setting thereof to move said accumulator to adding position, another transfer pin settable by said setting means and identifying a column of a card, means responsive to the appearance of a control hole in said column to operate said other pin to alter the condition of said co-acting means to thereby control the movement of said accumulator to neutral position while permitting said type bar to list.

9. In a tabulator, an accumulator having add, subtract and neutral positions, a card analyzer controlling the entry of data into said accumulator, said analyzer including means to sense a plurality of perforations formed in different columns of a card, settable transfer elements operatively connected to said analyzer and said accumulator, means controlled by said transfer elements to cause said accumulator to add in the absence of any of said perforations and to subtract when a perforation appears in one column of the card, and further means coacting with said transfer elements to cause said accumulator to assume a neutral position when a perforation appears in a different column.

10. In combination, an accumulator having variously adjustable positions and including interconnected and relatively adjustable plates, two movable accumulator position control members one carried by the other for conjoint movement therewith and also for movement relative thereto and the movements of said other member being variable in extent to differentially locate the first member relative to the plates of said accumulator, means to control the extent of movement of said other member, and means subsequently operated to move said first member relative to said other member to actuate one of said plates to adjust the same relative to each other.

11. In combination, an accumulator having variously adjustable positions and including interconnected and relatively adjustable plates, two movable accumulator position control members one carried by the other for conjoint movement therewith and also for movement relative thereto and the movements of said other member being variable in extent to differentially locate the first member relative to the plates of said accumulator, a variably adjustable interposer associated with said other member and having means thereon cooperating with a portion of the latter member to control the extent of conjoint movement of said control members, means to adjust said interposer, and means thereupon operable to move said first member relative to said other member and into engagement with one of said plates to adjust the same relative to each other.

12. In combination, an accumulator having variously adjustable positions and including interconnected and relatively adjustable plates, two movable accumulator position control members one carried by the other for conjoint movement therewith and also for movement relative thereto and the movements of said other member being variable in extent to differentially locate the first member relative to the plates of said accumulator, a variably adjustable interposer associated with said other member and having means thereon cooperating with a portion of the latter member to control the extent of conjoint movement of said control members, a differentially movable member connected to said interposer for variably adjusting the same, means to control the movements of said differentially movable member, and means thereafter operated to move said first member relative to said other member and into engagement with one of said plates to adjust the same relative to each other.

13. In combination, an accumulator having variously adjustable positions and including interconnected and relatively adjustable plates, two movable accumulator position control members one carried by the other for conjoint movement therewith and also for movement relative thereto and the movements of said other member being variable in extent to differentially locate the first member relative to the plates of said accumulator, a variably adjustable interposer associated with said other member and having means thereon cooperating with a portion of the latter member to control the extent of conjoint movement of said control members, a differentially movable member connected to said interposer for variably adjusting the same, differentially settable elements for controlling the movements of the last named movable member, and means thereafter operable to move said first member relative to said other member and into engagement with one of said plates to adjust the same relative to each other.

14. In combination, a plurality of accumulators capable of adjustment to various positions, a unit associated with said accumulators and including sectional transfer elements the sections of each having operative and inoperative positions relative to each other, a set-up device having means cooperating with sections of said transfer elements to adjust certain of them to operative position, and means under control of the operative transfer elements for adjusting the associated accumulators to certain positions.

15. In combination, a plurality of accumulators capable of adjustment to various positions, a unit associated with said accumulators and including sectional transfer elements the sections of each having operative and inoperative positions relative to each other, a set-up plate through which certain sections of said elements extend for adjustment thereby to operative positions, means under control of the operative transfer elements for adjusting the associated accumulators to certain positions, and other means actuated under control of certain other operative transfer elements, when a control hole appears in a card, to alter the control of the last named means to adjust said accumulators to other positions.

16. In combination, a plurality of accumulators capable of adjustment to various positions, a unit associated with said accumulators and including sectional transfer elements the sections of each having operative and inoperative positions relative to each other, a movable set-up device common to said transfer elements and having varisized openings therein through which sections of said elements extend for adjustment to operative position, the openings of one size identifying those elements which are to be so adjusted, means under control of the operative transfer elements for adjusting the associated accumulators to certain positions, and means including other operative transfer elements in said unit coacting with the first named elements to differentially control said accumulator adjusting means.

17. In combination, a plurality of accumulators capable of adjustment to various positions, a unit including transfer elements arranged in groups each identifying one of said accumulators and having operative and inoperative positions, a set-up plate common to said transfer elements and having means to adjust to operative position certain transfer elements in the various groups while leaving others in their inoperative position, and means controlled by the operative elements in said groups for adjusting accumulators identified thereby to certain positions.

18. In combination, a plurality of accumulators capable of adjustment to various positions, a transfer unit associated with said accumulators and comprising two sections each including transfer elements settable from inoperative to operative positions, with elements in each of said sections assigned to said accumulators, a set-up device common to the transfer elements in said sections and having means to set to operative position certain transfer elements in both said sections, means controlled by the operative elements in one section of said unit to adjust accumulators assigned to the latter elements to certain positions, and means controlled by the co-action of the operative elements in the other section of said unit with those in the first named section, when a control hole appears in a card, to adjust to other positions the accumulators assigned to the first named operative elements.

19. In combination, an accumulator capable of adjustment to various positions, a pair of transfer elements associated with said accumulator, a movable bail member for each transfer element engageable thereby, an interposer for each bail member having locking and unlocking positions relative thereto, means to control the positions of said interposers, and means differentially controlled by the engagement of said transfer elements with said bails and by the positions of said interposers relative to said bails for variously adjusting said accumulator.

20. In combination, an accumulator having variously adjustable positions, a control mechanism for said accumulator including a slidable control element having movements of variable extent and in a direction transverse to the sliding movement thereof, variably operable means for controlling the extent of variable movement of said control member to select one of the positions to be assumed by said accumulator, and other means then operable to slide said control member to adjust said accumulator to said selected position.

21. In combination, an accumulator having variously adjustable positions, two movable transfer pins co-acting to control the adjustment of said accumulator from one position to another, a member engageable with one end of each of said pins to prevent movement thereof, a locking element for each member for maintaining it in operative position relative to the associated pin and movable to unlocking position, selectively operable means for adjusting either one of said locking elements to unlocking position relative to its associated member, a rockingly supported element engageable with the other ends of said pins to sense the locked or unlocked condition of said pins and actuated by such engagement, means controlled by the actuation of said sensing element to select the position to which said accumulator is to be adjusted, and means to then adjust said accumulator to said position.

22. In combination, an accumulator having variously adjustable positions and including relatively adjustable plates, a position control mechanism including a control member having movements in one direction and of different extent relative to said plates and to positions in alignment with either one or both of them, means for controlling the extent of movement of said control member, and means to thereupon move said control member in a different direction from the first named movement to engage the same with and actuate one of said plates to relatively adjust the same.

23. In combination, a type bar, an accumulator having variously adjustable positions relative to said type bar, a position control mechanism including a control member having movements of variable extent relative to said accumulator, variably operable means independent of said type bar for controlling the extent of movement of said control member to select the position to be assumed by said accumulator, and other means for then moving said control member to adjust said accumulator to the selected position.

24. In combinaiton, a type bar, an accumulator having variously adjustable positions relative to said type bar, a position control mechanism including a control member having movements of variable extent relative to said accumulator, variably operable means for controlling the extent of movement of said control member to select the position to be assumed by said accumulator, and other means independent of said variably operable means and actuated subsequent to the selective movement of said control member for further moving the latter to adjust said accumulator to the selected position.

25. In combination, an accumulator having variously adjustable positions, a position control mechanism including a movable member having a stop, a control member having different movements one of which is with and the other relative to said movable member, adjustable means engageable by said stop when said movable and control members are moved together for differentially interrupting such movement to thereby denote a position to be assumed by said accumulator, differentially operable means to adjust said adjustable means, and means to move said control member relative to said movable member to adjust said accumulator to the denoted position thereof.

26. In combination, an accumulator having a plurality of positions to which it may be adjusted, differentially controlled means for adjusting said accumulator to said positions, a pair of movable elements assigned to said accumulator, means to differentially condition said movable elements against movement to thereby denote the position to be assumed by said accumulator, means cooperating with said movable elements to sense the condition thereof, and means influenced by said sensing means to differentially control said accumulator adjusting means in accordance with the condition of said movable elements.

27. In a tabulator, an accumulator having different positions of adjustment, a card analyzer controlling the entry of data into said accumulator, said analyzer including means operable during each cycle to sense a control perforation in any column of a card, settable transfer elements operatively associated with said analyzer and said accumulator, means to set said transfer elements so that they will remain in one settable position throughout successive cycles of operation of said analyzer, means controlled by certain of said transfer elements, upon the non-appearance of said perforation, to cause said accumulator to assume one position of adjustment, and means controlled by certain other transfer elements, upon the appearance of said perforation in any column, to vary the operation of the last named controlled means to cause said accumulator to assume a different position of adjustment.

28. In combination, an accumulator having variously adjustable positions, a control mechanism for said accumulator including a control member operatively associated with said accumulator and having movements of variable extent each relative to said accumulator, variably operable means cooperating with said control member for controlling the extent of movement thereof to select a position to be assumed by said accumulator, and other means operatively connected to said control member to then actuate the same to adjust said accumulator to said selected position.

29. In combination, an accumulator having variously adjustable positions, a control mechanism for said accumulator including a control member operatively associated with said accumulator and having movements of variable extent and in the same direction relative to said accumulator, variably operable means cooperating with said control member for controlling the extent of movement thereof in said direction to select a position to be assumed by said accumulator, and other means operatively connected to said control member for moving the same in a different direction to adjust the accumulator to said selected position.

30. In combination, an accumulator having variously adjustable positions, a control mechanism for said accumulator including a control member operatively associated with said accumulator and having movements of variable extent each relative to said accumulator and preliminary to an adjustment thereof, variably operable means cooperating with said control member for controlling the extent of movement thereof to select a position to be assumed by said accumulator, and other means operatively connected to said control member to actuate the same subsequent to the preliminary selective movement thereof to adjust said accumulator to said position.

31. In combination, an accumulator having variously adjustable positions, a control mechanism for said accumulator including a control member operatively associated with said accumulator and having movements of variable extent and in the same direction relative to said accumulator preliminary to an adjustment thereof, variably operable means cooperating with said control member for controlling the extent of movement thereof in said direction to select a position to be assumed by said accumulator, and other means connected to said control member for moving the same in a different direction and subsequent to the initial movement thereof to adjust the accumulator to said selected position.

32. In combination, an accumulator having neutral and operative positions, a rack associated with said accumulator and having differently timed accumulating and total-taking cycles, means to move said accumulator into operative association with said rack during either of said cycles, an operating member for said means having a neutral position and operative positions corresponding to the operative positions of said accumulator, separate means each operable to control the movement of said operating member to one of its operative positions during one of said cycles, a common connection between said separate means and said operating member to move the latter from neutral to one of its operative positions upon operation of one of said separate means, actuating elements for the said operating member each having means for coupling the same to said member after the latter has been moved to one of its operative positions by said common connections to thereby operate said accumulator moving means, and means controlled by said common connection as it moves said operating member to an operative position and, in turn, controlling the same at the conclusion of one of said cycles for restoring said operating member to neutral position.

33. In combination, an accumulator having neutral and operative positions, a rack associated with said accumulator and having differently timed accumulating and total-taking cycles, means to move said accumulator into operative association with said rack during either of said cycles, an operating member for said means having a neutral position and operative positions corresponding to the operative positions of said accumulator, separate means each operable to control the movement of said operating member to one of its operative positions during one of said cycles, a common connection between said separate means and said operating member to move the latter from neutral to one of its operative positions upon operation of one of said separate means, actuating elements for the said operating member each having means for coupling the same to said member after the latter has been moved to one of its operative positions by said common connections to thereby operate said accumulator moving means, locking means cooperating with said operating member effective subsequent to the operation of said actuating elements and during either one of said cycles to prevent restoration of said operating member to neutral position, and means controlled by said common connection as it moves said operating member to an operative position and, in turn, controlling the same at the conclusion of one of said cycles for restoring said operating member to neutral position.

WILLIAM WOCKENFUSS.

REFERENCES CITED

The following references are of record in the file of this patent:

UNITED STATES PATENTS

| Number | Name | Date |
|---|---|---|
| 1,206,878 | Martin | Dec. 5, 1916 |
| 1,817,451 | Gubelmann | Aug. 4, 1931 |
| 2,093,731 | La Boiteaux | Sept. 21, 1937 |
| 2,130,723 | Kottmann | Sept. 20, 1938 |
| 2,153,299 | Dahlberg | Apr. 4, 1939 |
| 2,222,373 | Rauh | Nov. 19, 1940 |
| 2,237,908 | Lasker | Apr. 8, 1941 |
| 2,247,916 | Lake | July 1, 1941 |
| 2,282,067 | Lang | May 5, 1942 |
| 2,307,635 | Mueller | Jan. 5, 1943 |
| 2,323,816 | Lasker et al. | July 6, 1943 |
| 2,336,111 | Mayorga et al. | Dec. 7, 1943 |
| 2,360,610 | Lasker | Oct. 17, 1944 |
| 2,364,934 | Baldwin | Dec. 12, 1944 |
| 2,426,951 | Ritzert | Sept. 2, 1947 |
| 2,429,730 | Pitman | Oct. 28, 1947 |
| 2,438,081 | Watson et al. | Mar. 16, 1948 |

Certificate of Correction

Patent No. 2,562,250                                          July 31, 1951

WILLIAM WOCKENFUSS

It is hereby certified that error appears in the printed specification of the above numbered patent requiring correction as follows:

Column 44, line 7, strike out "first named" and insert the same before "movement" in line 6, same column;

and that the said Letters Patent should be read as corrected above, so that the same may conform to the record of the case in the Patent Office.

Signed and sealed this 1st day of January, A. D. 1952.

[SEAL]

THOMAS F. MURPHY,
*Assistant Commissioner of Patents.*